US011912093B2

(12) United States Patent
S Op de Beeck

(10) Patent No.: US 11,912,093 B2
(45) Date of Patent: Feb. 27, 2024

(54) SYSTEM AND METHOD FOR VEHICLE

(71) Applicant: DRiV Automotive Inc., Lake Forest, IL (US)

(72) Inventor: Frederic Frans S Op de Beeck, Herenthout (BE)

(73) Assignee: DRiV Automotive Inc., Lake Forest, IL (US)

( * ) Notice: Subject to any disclaimer, the term of this patent is extended or adjusted under 35 U.S.C. 154(b) by 169 days.

(21) Appl. No.: 17/368,152

(22) Filed: Jul. 6, 2021

(65) Prior Publication Data

US 2023/0012190 A1 Jan. 12, 2023

(51) Int. Cl.
*B60G 17/019* (2006.01)

(52) U.S. Cl.
CPC ...... *B60G 17/019* (2013.01); *B60G 2400/104* (2013.01); *B60G 2400/106* (2013.01); *B60G 2400/204* (2013.01); *B60G 2400/302* (2013.01); *B60G 2400/34* (2013.01); *B60G 2400/38* (2013.01); *B60G 2400/39* (2013.01); *B60G 2400/412* (2013.01); *B60G 2500/104* (2013.01); *B60G 2800/802* (2013.01); *B60G 2800/85* (2013.01); *B60G 2800/91* (2013.01)

(58) Field of Classification Search
CPC ............ B60G 17/019; B60G 2400/104; B60G 2400/106; B60G 2400/204; B60G 2400/302; B60G 2400/34; B60G 2400/38; B60G 2400/39; B60G 2400/412; B60G 2500/104; B60G 2800/802; B60G 2800/85; B60G 2800/91
See application file for complete search history.

(56) References Cited

U.S. PATENT DOCUMENTS

| 4,744,239 | A | * | 5/1988 | Kyrtsos | B60G 17/0185 73/11.07 |
|---|---|---|---|---|---|
| 4,828,283 | A | * | 5/1989 | Ishii | B60G 17/0523 280/5.521 |
| 4,948,166 | A | * | 8/1990 | Kaneko | B60G 17/016 180/41 |
| 5,390,121 | A | * | 2/1995 | Wolfe | B60G 17/0185 280/124.101 |

(Continued)

FOREIGN PATENT DOCUMENTS

| CN | 106023344 A | 10/2016 |
|---|---|---|
| CN | 110155073 | 6/2020 |
| CN | 110386145 B | 7/2020 |

*Primary Examiner* — Frank B Vanaman
(74) *Attorney, Agent, or Firm* — McGarry Bair PC

(57) ABSTRACT

A system for a vehicle includes a memory storing a stored driver distribution profile of a driver input parameter and a stored suspension setting corresponding to the stored driver distribution profile. The system further includes a sensor to detect a current value of the driver input parameter. The system further includes a processor communicably coupled to the memory and the sensor. The processor is configured to determine a current driver distribution profile of the driver input parameter based on the current value of the driver input parameter. The processor is configured to determine a current suspension setting based on the current driver distribution profile. The processor is configured to adjust the stored suspension setting to generate a stored adjusted suspension setting corresponding to the current suspension setting.

24 Claims, 29 Drawing Sheets

(56) References Cited

U.S. PATENT DOCUMENTS

| | | | |
|---|---|---|---|
| 9,809,077 B2 | 11/2017 | Stoof et al. | |
| 10,259,468 B2 | 4/2019 | Avireddi et al. | |
| 2003/0205867 A1* | 11/2003 | Coelingh | B60G 17/033 |
| | | | 280/5.5 |
| 2008/0269986 A1* | 10/2008 | Regnell | B60G 17/0523 |
| | | | 701/37 |
| 2014/0222287 A1* | 8/2014 | Popham | B60G 17/0165 |
| | | | 701/37 |
| 2017/0174221 A1 | 6/2017 | Vaughn et al. | |
| 2017/0369076 A1* | 12/2017 | Goo | B60W 10/22 |
| 2018/0113461 A1 | 4/2018 | Potnis et al. | |
| 2018/0297437 A1* | 10/2018 | Bennett | B60G 17/0195 |
| 2020/0031361 A1 | 1/2020 | Soliman | |
| 2020/0282791 A1 | 9/2020 | Lalwani | |

* cited by examiner

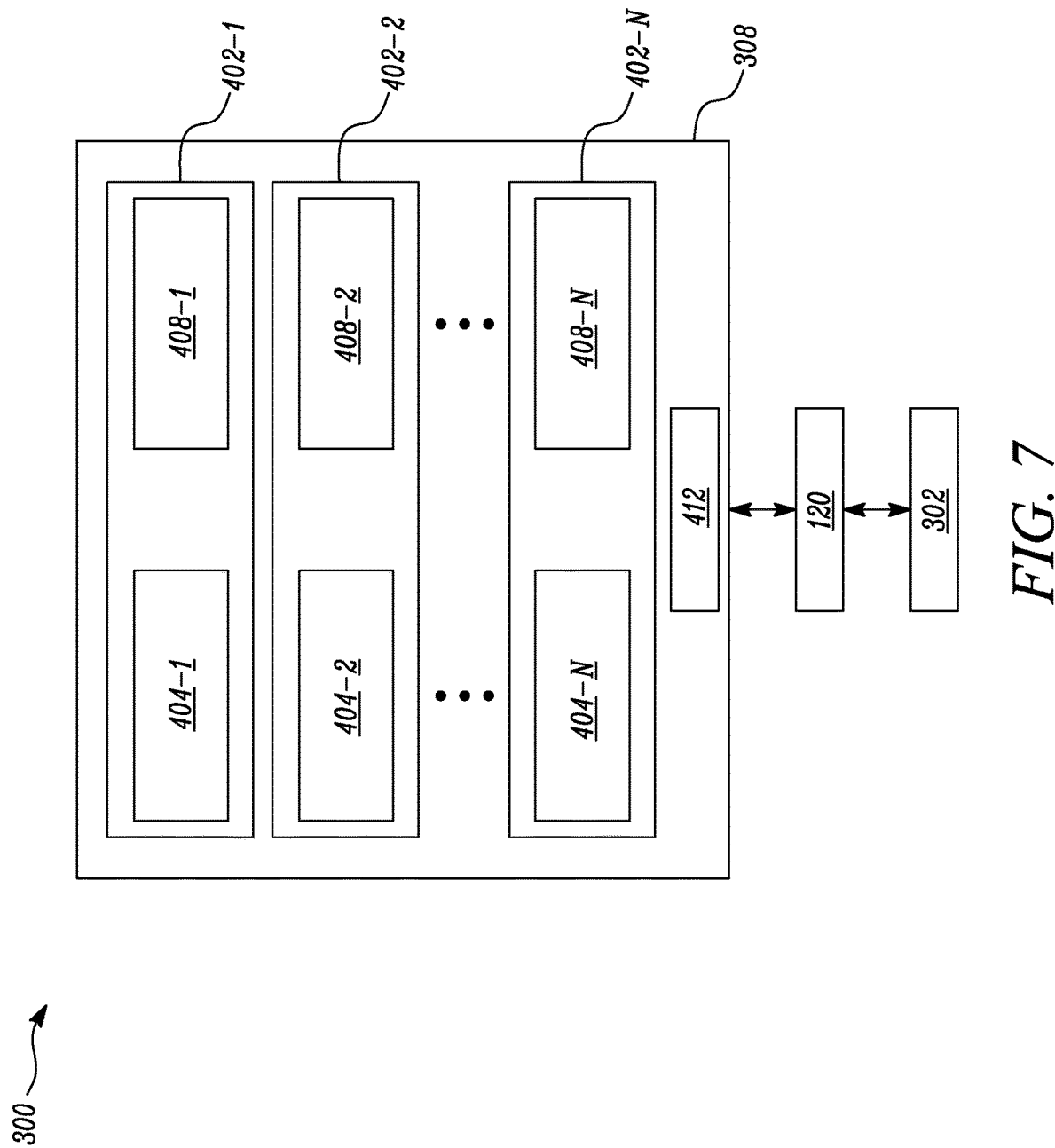

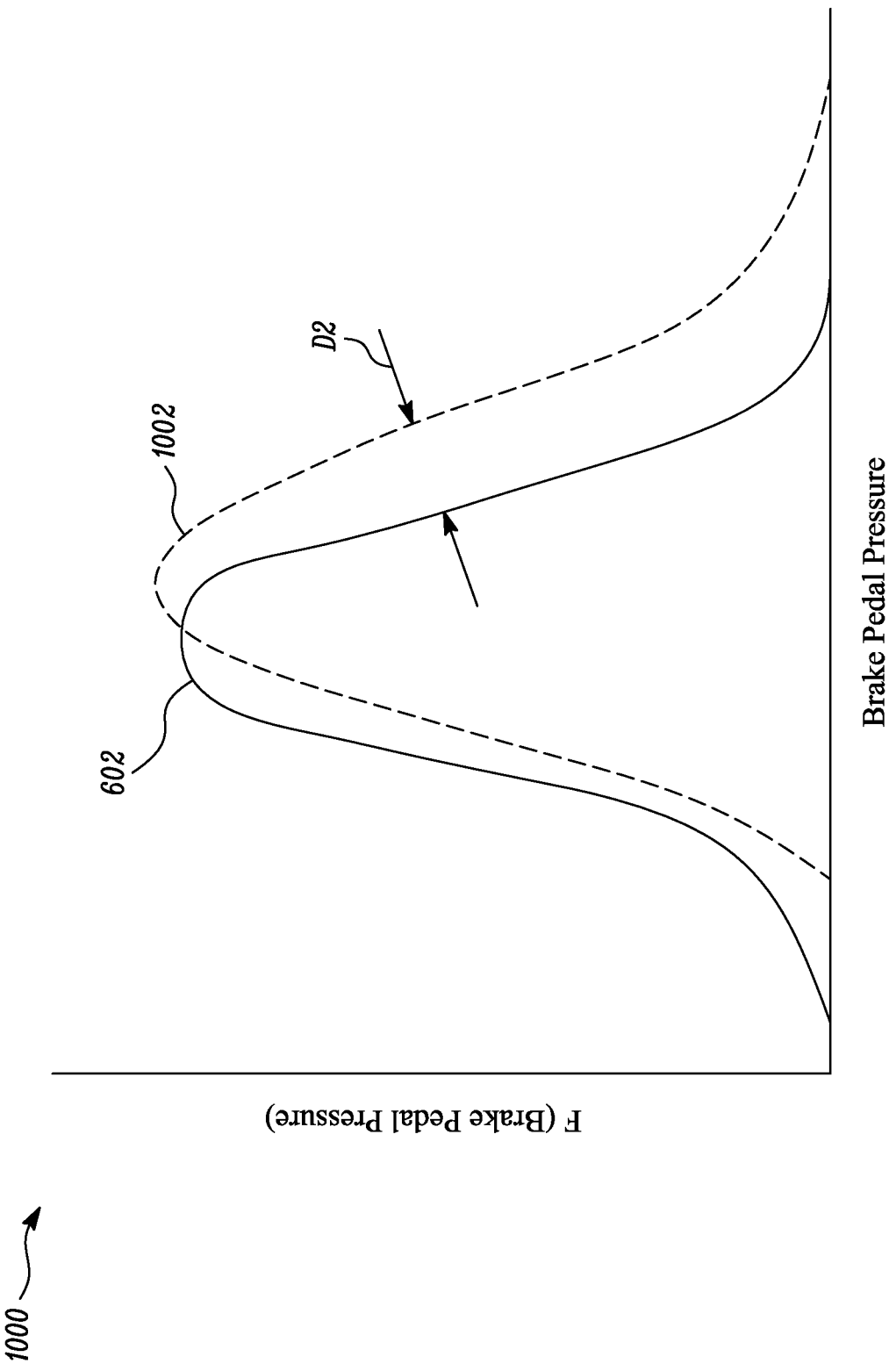

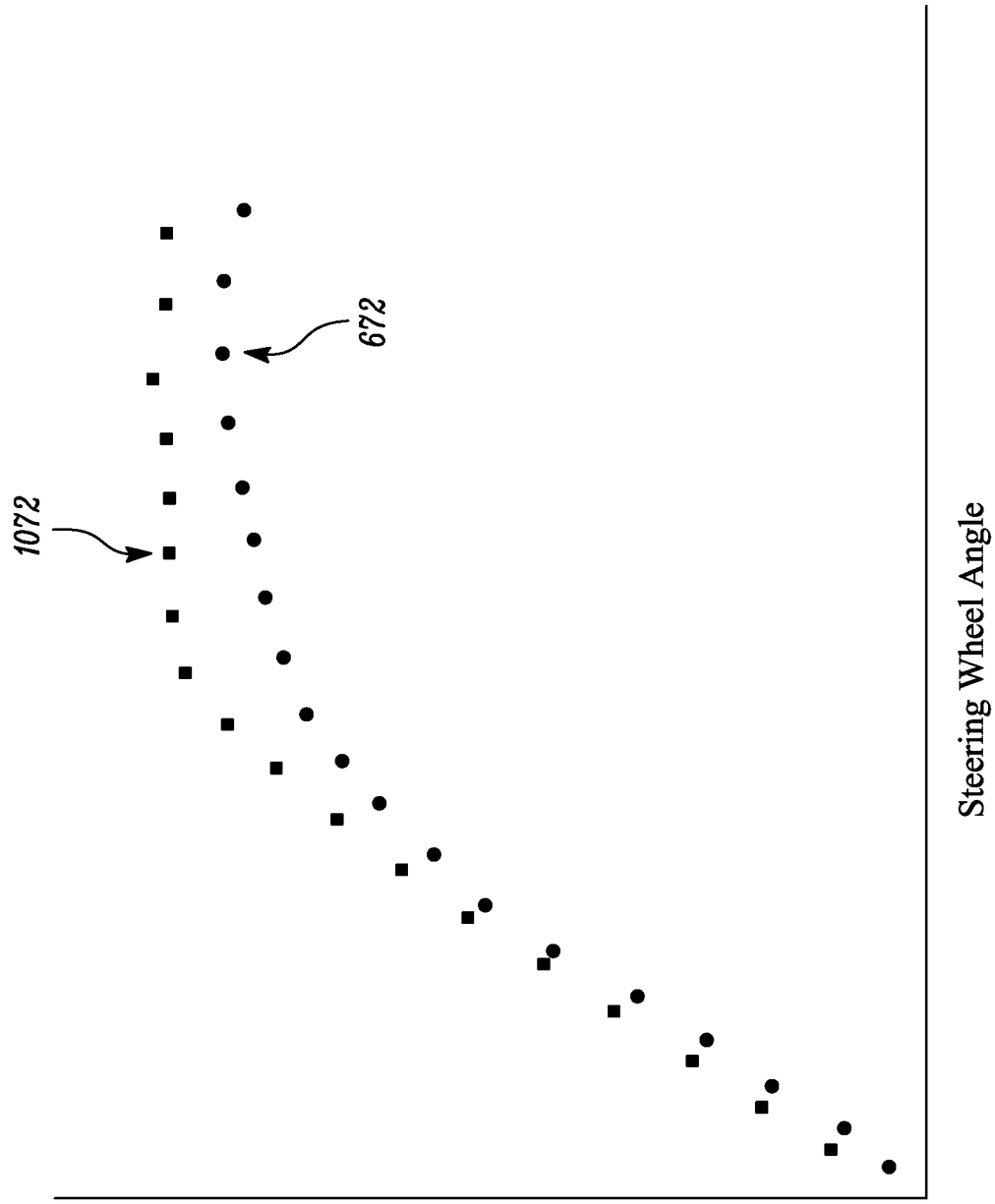

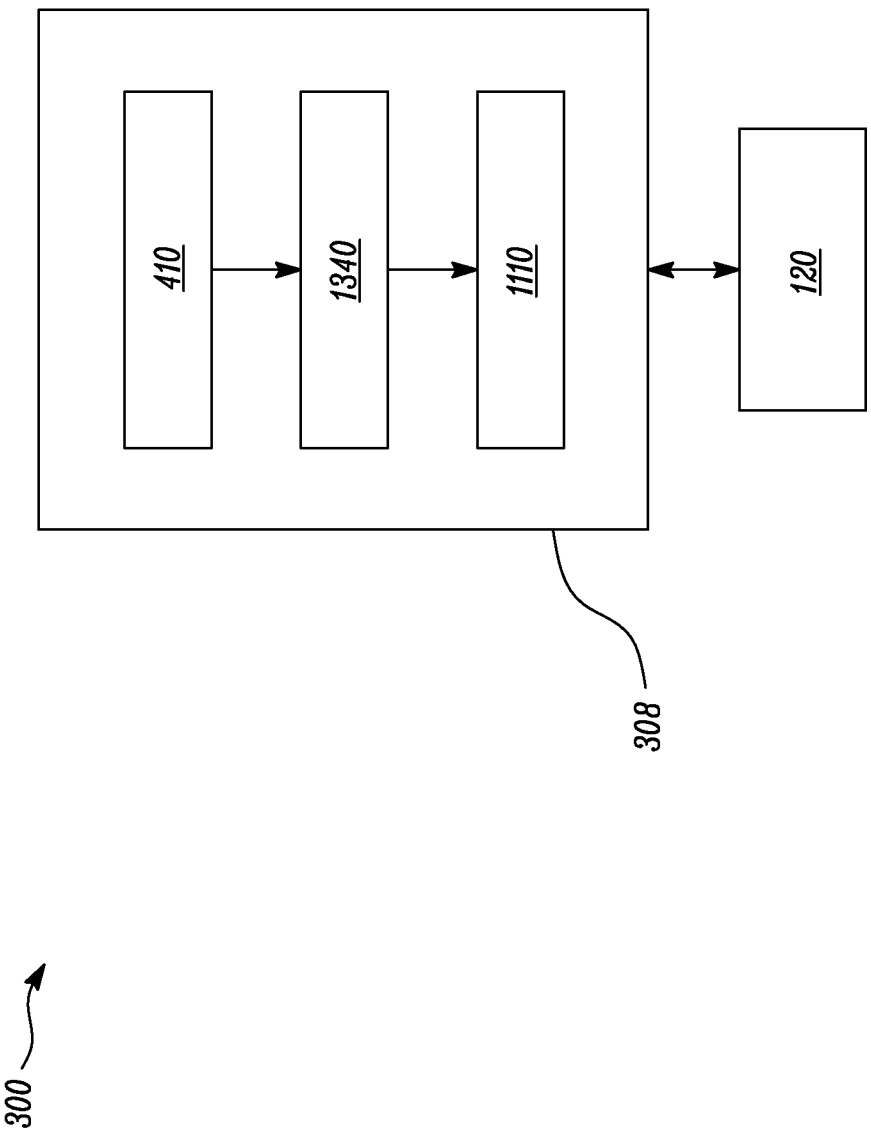

SYSTEM AND METHOD FOR VEHICLE

TECHNICAL FIELD

The present disclosure relates to a system for a vehicle, and particularly a system and a method for adjusting suspension of a vehicle.

BACKGROUND

Drivability is the dynamics of a vehicle in response to driver inputs and a driver's subjective perception of the driver inputs. Vehicle dynamics may include adjustable suspension settings of the vehicle in response to driver inputs. Conventional methods to adjust a suspension setting for a vehicle may not consider driver inputs/driver behavior. In general, while adjusting the suspension setting of the vehicle, the conventional methods mostly focus on conditions and characteristics of a road at which the vehicle is being driven. In some cases, a suspension setting of the vehicle is adjusted based on road condition ahead of the vehicle. In some cases, the suspension setting of the vehicle is adjusted based on unexpected hurdles on the road, such as potholes, humps, worn away surfaces, surface deterioration, rutting, crazing, and the like.

Further, in the conventional methods for adjusting vehicle suspension, the driver behavior and vehicle dynamics may not correlate with each other to improve and personalize the suspension setting of the vehicle for that particular driver. This may reduce a ride quality and a ride comfort for the driver. In some cases, there are predetermined suspension settings for various stored driver input profiles. However, the conventional methods may not take into account the driver behavior to generate or determine a new suspension setting. In other words, the conventional methods for adjusting the vehicle suspension may include only open loop technologies that do not consider the driver behavior for adjusting the suspension setting of the vehicle.

SUMMARY

According to a first aspect, there is provided a system for a vehicle. The system includes a memory storing a stored driver distribution profile of a driver input parameter and a stored suspension setting corresponding to the stored driver distribution profile. Each of the stored driver distribution profile and the stored suspension setting corresponds to a driver of the vehicle. The system further includes a sensor to detect a current value of the driver input parameter while the driver is driving the vehicle. The system further includes a processor communicably coupled to the memory and the sensor. The processor is configured to determine a current driver distribution profile of the driver input parameter based on the current value of the driver input parameter. The processor is configured to determine a deviation between the current driver distribution profile and the stored driver distribution profile. The processor is further configured to determine a current suspension setting based on the current driver distribution profile if the deviation is greater than a predetermined threshold. The processor is further configured to adjust the stored suspension setting to generate a stored adjusted suspension setting corresponding to the current suspension setting. The processor is further configured to replace the stored suspension setting with the stored adjusted suspension setting in the memory such that the stored adjusted suspension setting corresponds to the driver.

According to a second aspect, there is provided a method for use with a vehicle. The method includes storing, in a memory, a stored driver distribution profile of a driver input parameter and a stored suspension setting corresponding to the stored driver distribution profile. Each of the stored driver distribution profile and the stored suspension setting corresponds to a driver of the vehicle. The method further includes detecting, by a sensor, a current value of the driver input parameter while the driver is driving the vehicle. The method further includes determining, by a processor, a current driver distribution profile of the driver input parameter based on the current value of the driver input parameter. The method further includes determining, by the processor, a deviation between the current driver distribution profile and the stored driver distribution profile. The method further includes determining, by the processor, a current suspension setting based on the current driver distribution profile if the deviation is greater than a predetermined threshold. The method further includes adjusting, by the processor, the stored suspension setting to generate a stored adjusted suspension setting corresponding to the current suspension setting. The method further includes replacing, by the processor, the stored suspension setting with the stored adjusted suspension setting in the memory such that the stored adjusted suspension setting corresponds to the driver.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF DRAWINGS

FIG. 7 is a detailed functional block diagram of the system of FIG. 3A, according to another embodiment of the present disclosure;

FIG. 10A is a plot depicting a current distribution function of the brake pedal pressure of the vehicle, according to an embodiment of the present disclosure;

FIG. 10D is a plot depicting a current suspension function corresponding to the current distribution function of FIG. 10C, according to an embodiment of the present disclosure;

FIG. 13C is another detailed functional block diagram of the system of FIG. 3A, according to an embodiment of the present disclosure;

DETAILED DESCRIPTION

Figure 1:
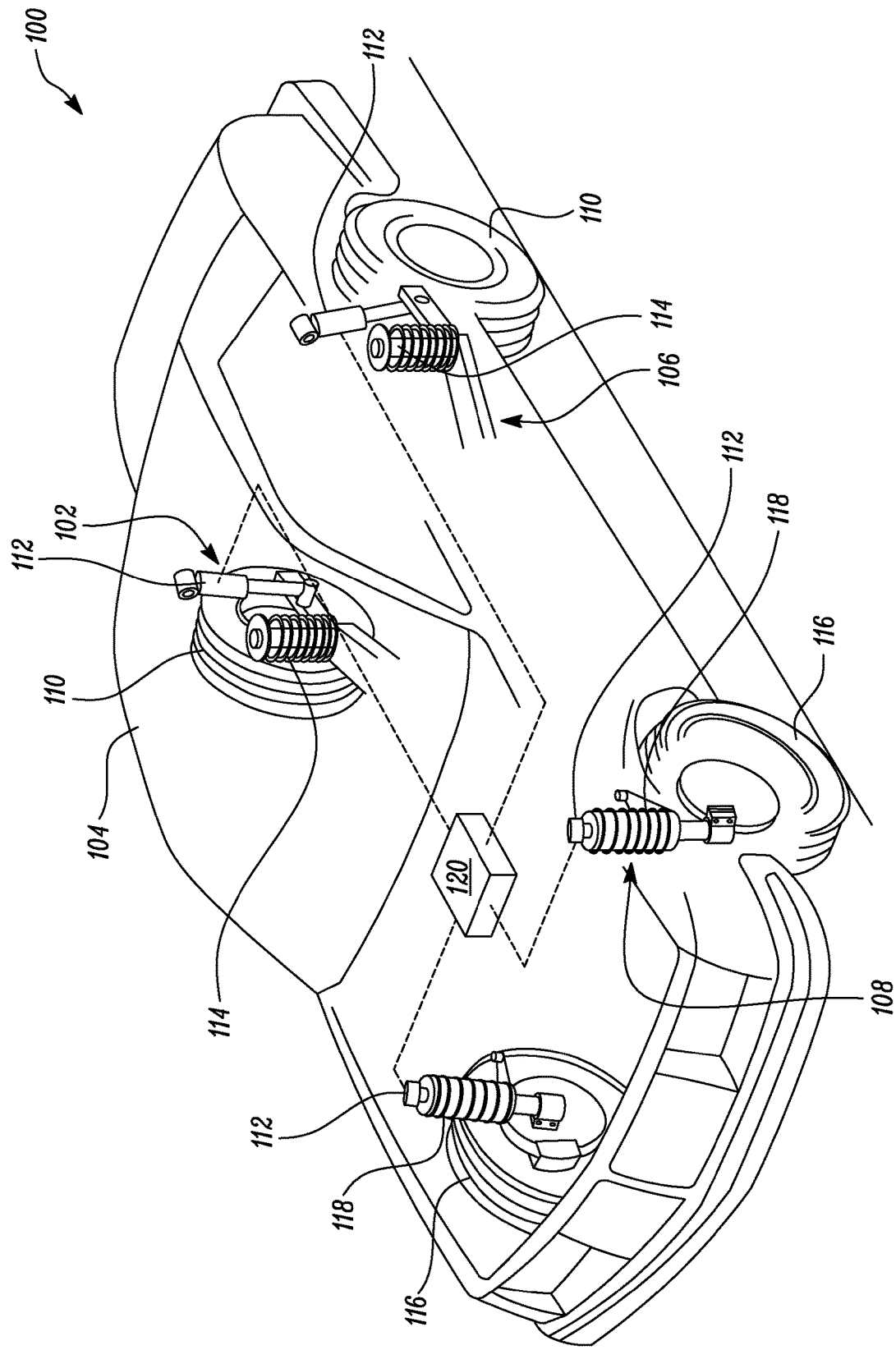
FIG. 1 is an illustration of a vehicle, according to an embodiment of the present disclosure.

The following description of the preferred embodiment(s) is merely exemplary in nature and is in no way intended to limit the invention, its application, or uses. Referring now to the drawings in which like reference numerals designate like or corresponding parts throughout the several views.

FIG. 1 illustrates a vehicle 100 according to an embodiment of the present disclosure. The vehicle 100 may include a vehicle driven by an internal combustion engine, an electric vehicle, a hybrid vehicle, or an autonomous vehicle. The vehicle includes a suspension system 102 and a body 104. The suspension system 102 includes a rear suspension 106 and a front suspension 108. The rear suspension 106 includes a transversely extending rear axle assembly (not shown) adapted to operatively support a pair of rear wheels 110. The rear axle assembly is operatively connected to the body 104 by means of a pair of shock absorbers 112 and a pair of helical coil springs 114. Similarly, the front suspension 108 includes a transversely extending front axle assembly (not shown) which operatively supports a pair of front wheels 116. The pairs of front and rear wheels 116, 110 may collectively be referred to as "wheels 110, 116". The front axle assembly is operatively connected to the body 104 by means of another pair of the shock absorbers 112 and a pair of helical coil springs 118. Therefore, the suspension system 102 includes four shock absorbers 112. In some embodiments, each of the four shock absorbers 112 is substantially similar to each other and is referenced herein by the same reference numeral 112. In an alternative embodiment, the vehicle 100 may include an independent suspension unit (not shown) for each of the four corners instead of front and rear axle assemblies.

The shock absorbers 112 of the suspension system 102 serve to damp relative movement of the unsprung portion (i.e., the front and rear suspensions 108, 106) and the sprung portion (i.e., the body 104) of the vehicle 100. While the vehicle 100 has been depicted as a passenger car, the shock absorbers 112 may be used with other types of vehicles 100. Examples of such vehicles 100 include buses, trucks, off-road vehicles, and so forth. Furthermore, the term "shock absorber 112" as used herein refers to dampers in general and will include McPherson struts, and semi-active and active suspensions.

In order to automatically adjust each of the shock absorbers 112, a processor 120 is electrically connected to each of the shock absorbers 112. The processor 120 is used for controlling an operation of each of the shock absorbers 112 in order to provide appropriate damping characteristics resulting from movements of the body 104 of the vehicle 100. Further, the processor 120 may independently control each of the shock absorbers 112 in order to independently control a damping level of each of the shock absorbers 112. The processor 120 may be electrically connected to the shock absorbers 112 via wired connections, wireless connections, or a combination thereof.

Figure 2:
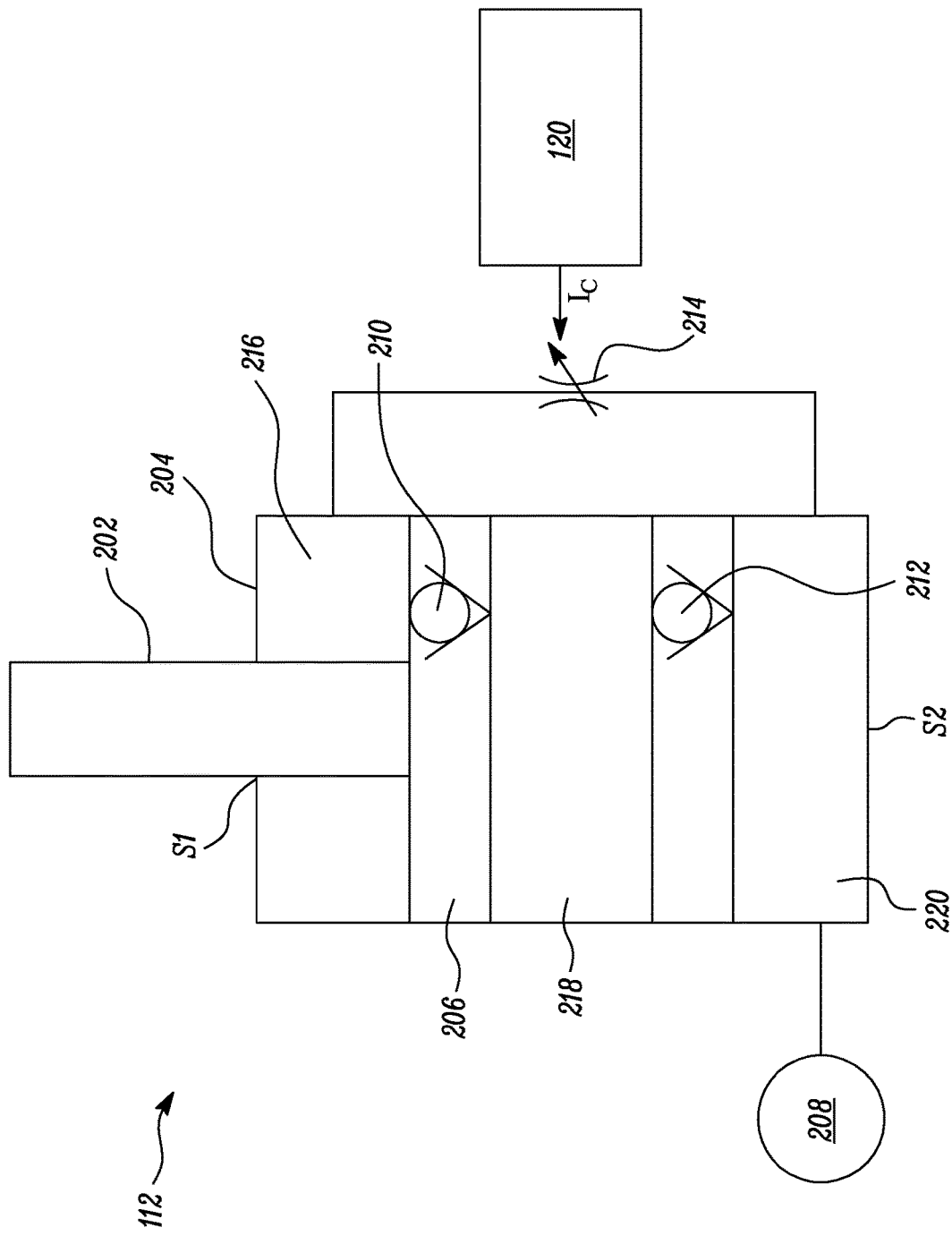
FIG. 2 is a block diagram of a shock absorber of the vehicle of FIG. 1, according to an embodiment of the present disclosure.

FIG. 2 illustrates a schematic view of an exemplary shock absorber. In some embodiments, the exemplary shock absorber of FIG. 2 is any of the four shock absorbers 112. Therefore, the exemplary shock absorber of FIG. 2 is interchangeably referred to as "the shock absorber 112". In some embodiments, the shock absorber 112 may be a continuously variable semi-active (CVSA) shock absorber. The shock absorber 112 includes a rod 202, a cylinder 204, a piston 206, an accumulator 208, a piston valve 210, a base valve 212 and an electronic valve 214. The cylinder 204 may contain a hydraulic fluid, such as an oil. The cylinder 204 includes a rebound chamber 216, a compression chamber 218, and a reservoir chamber 220. In some embodiments, the piston valve 210 and the base valve 212 are check valves. Further, in some embodiments, the electronic valve 214 may be a current controlled CVSA valve. Moreover, the electronic valve 214 may be a two-position solenoid valve. The electronic valve 214 may be communicably coupled with the processor 120. The electronic valve 214 may be a solenoid operated valve and may be controlled by an input current "Ic" generated by the processor 120. The input current "Ic" may vary between lower and upper limits, which may correspond to low and high restrictions to the flow of the hydraulic fluid through the electronic valve 214. The processor 120 generates the input current "Ic" in order to control the operation of the shock absorber 112.

During operation of the shock absorber 112, when the piston 206 moves towards a top dead center S1 of the cylinder 204 (i.e., during a rebound stroke), volume of the rod 202 in the rebound chamber 216 reduces. Thereafter, the piston valve 210 closes and the hydraulic fluid flows through the electronic valve 214. Further, the hydraulic fluid is forced to flow from the accumulator 208 into the compression chamber 218 of the cylinder 204 through the reservoir chamber 220 and the base valve 212.

When the piston 206 moves towards a bottom dead center S2 of the cylinder 204 (i.e., during a compression stroke), the volume of the rod 202 in the rebound chamber 216 increases. Thereafter, the piston valve 210 opens, and the hydraulic fluid flows through the electronic valve 214. Further, the base valve 212 closes and the hydraulic fluid flows through the electronic valve 214 to the accumulator 208, through the reservoir chamber 220.

The processor 120 may control a damping force of each of the shock absorbers 112 by controlling a degree of restriction to the flow of the hydraulic fluid through the electronic valve 214. Specifically, the processor 120 may regulate the input current "Ic" to vary the degree of restriction to the flow through the electronic valve 214. A low value of the input current "Ic" may correspond to a low restriction to the flow through the electronic valve 214, thereby yielding a low damping force. Further, a high value of the input current "Ic" may correspond to a high restriction to the flow through the electronic valve 214, thereby yielding a high damping force.

In some embodiments, the processor 120 may use a lookup table, a physical model or a mathematical relationship to regulate the input current "Ic" in order to obtain a desired damping force for the shock absorber 112. Further, the processor 120 may independently control the electronic valve 214 of each of the shock absorbers 112 in order to independently control the damping force in each of the shock absorbers 112.

The shock absorber 112 of FIG. 2 is exemplary in nature and alternate configurations of the shock absorber 112 are possible within the scope of the present disclosure. For example, the shock absorber 112 may include two electronic valves (not shown). One of the electronic valves may control a flow of the hydraulic fluid between the rebound chamber 216 and the accumulator 208, and the other electronic valve may control a flow of the hydraulic fluid between the compression chamber 218 and the accumulator 208.

Figure 3A:
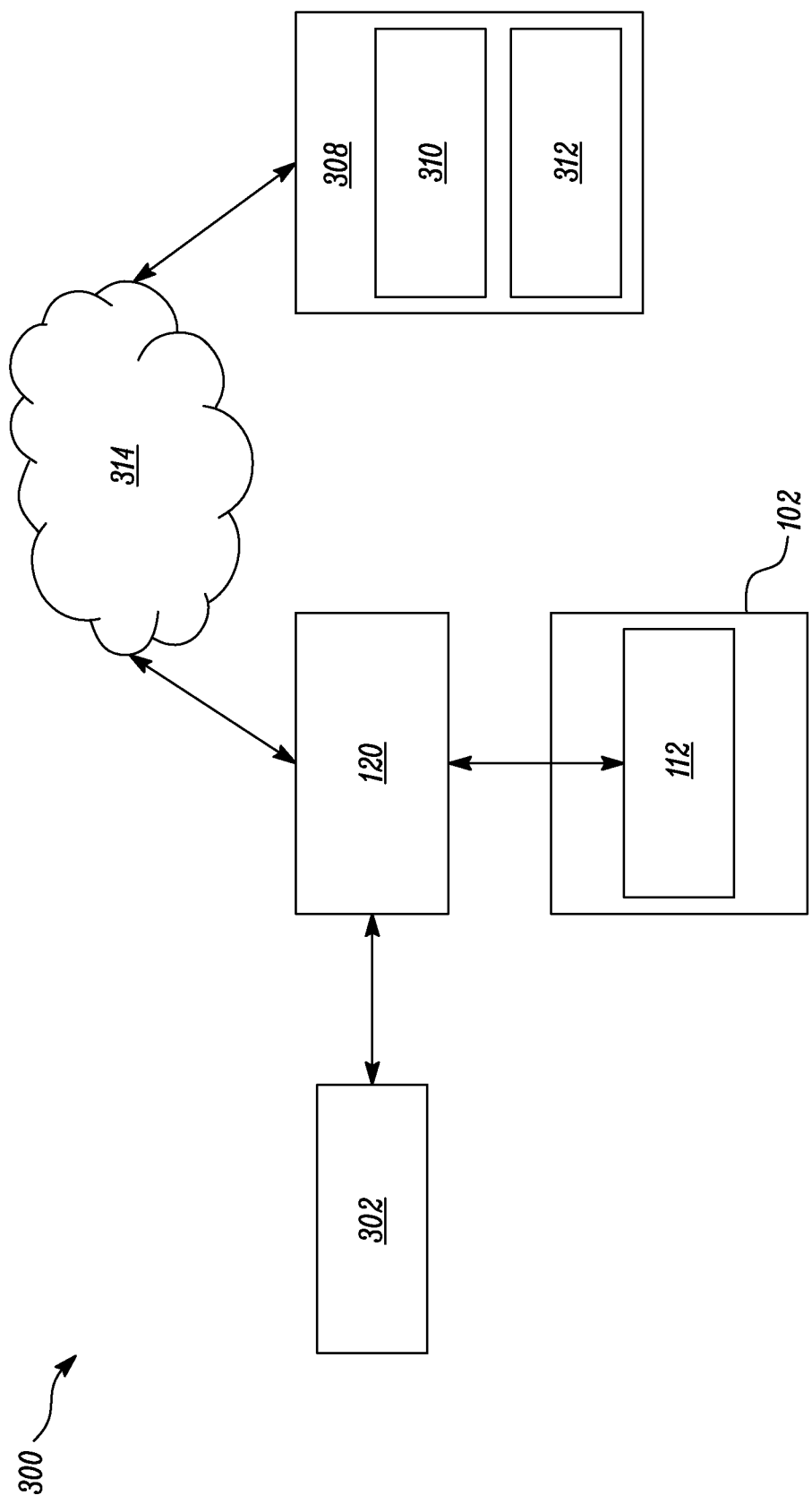
FIG. 3A is a functional block diagram of a system for the vehicle of FIG. 1, according to an embodiment of the present disclosure.

FIG. 3A illustrates a functional block diagram of a system 300 for the vehicle 100 of FIG. 1, according to an embodiment of the present disclosure. The system 300 may be implementable in one or more electronic control units (ECUs) (not shown) of the vehicle 100. In some cases, the system 300 may be implementable in a computing device associated with the vehicle 100. The system 300 is arranged to control the suspension system 102 of the vehicle 100 by controlling one or more shock absorbers 112 of the vehicle 100.

The system 300 includes a sensor 302, the processor 120, and a memory 308. The sensor 302 is arranged to detect one or more parameters associated with one or more drivers (not shown) of the vehicle 100 (shown in FIG. 1). The processor 120 may be a programmable analog and/or digital device that can store, retrieve, and process data. In an application, the processor 120 may be a controller, a control circuit, a computer, a workstation, a microprocessor, a microcomputer, a central processing unit, a server, or any suitable device or apparatus. The processor 120 is communicably coupled to the memory 308 and the sensor 302.

The memory 308 includes a database 310. The database 310 may have a data structure to store organized information and data. The memory 308 further includes a set of instructions 312 executable by the processor 120 to control the suspension system 102 (shown in FIG. 1) of the vehicle 100.

In some embodiments, the memory 308 may be stored on board the vehicle 100. In some embodiments, the memory 308 may be located remotely, such as in a remote server or on a cloud. In cases where the memory 308 is located remotely, the processor 120 is communicably coupled with the memory 308 via a network 314. In some embodiments, the processor 120 may be communicably coupled to the memory 308 via the network 314 through a transceiver unit (not shown).

Further, the processor 120 is operatively coupled with the suspension system 102 of the vehicle 100. Specifically, the processor 120 is operatively coupled with each of the shock absorbers 112 of the vehicle 100. The processor 120 is configured to control the one or more shock absorbers 112 of the vehicle 100.

Figure 3B:
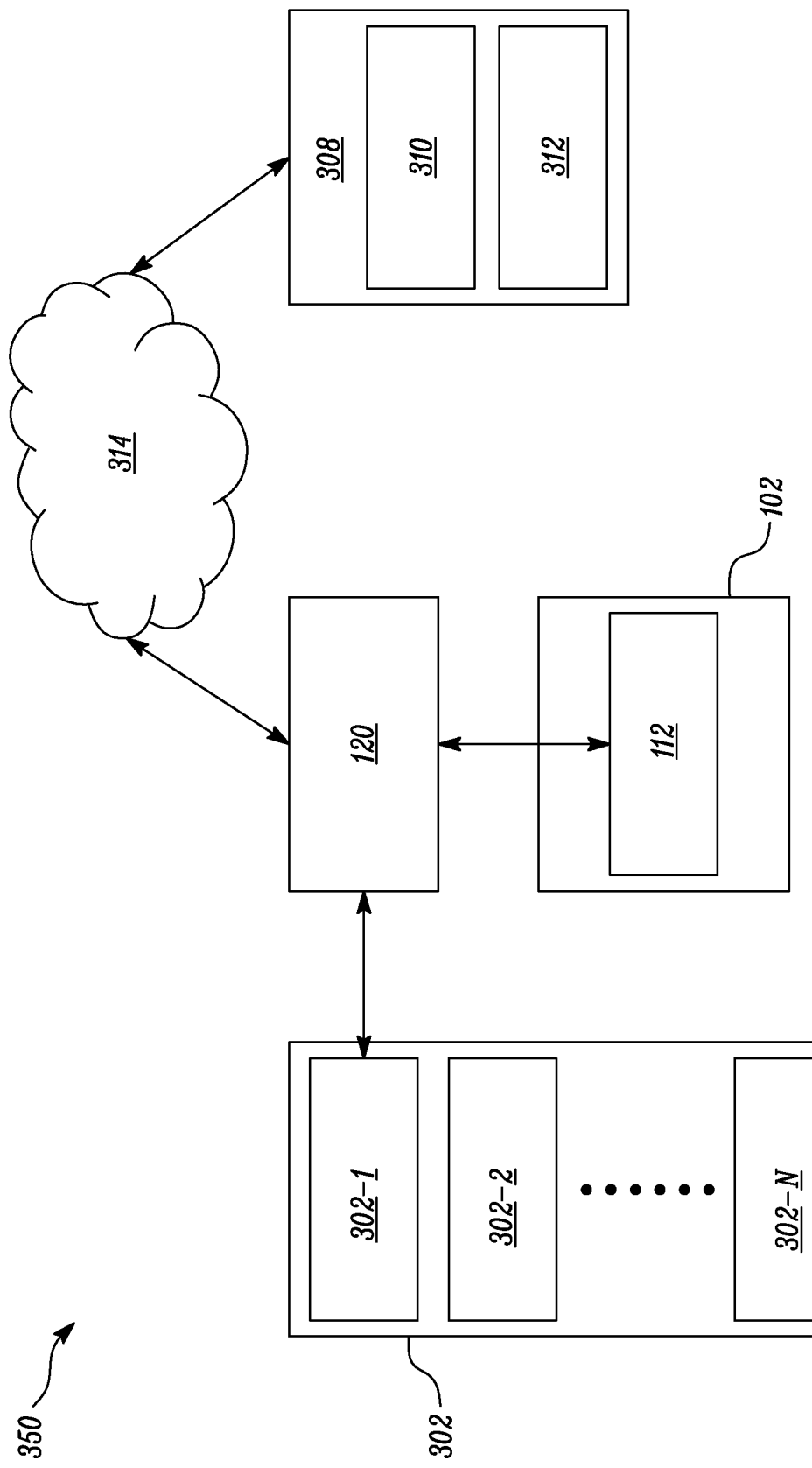
FIG. 3B is a functional block diagram of a system for the vehicle of FIG. 1, according to another embodiment of the present disclosure.

FIG. 3B illustrates a functional block diagram of a system 350 for the vehicle 100 of FIG. 1, according to an embodiment of the present disclosure. The system 350 is substantially similar to the system 300 of FIG. 3A. Common components between the system 300 and the system 350 are illustrated by the same numerals. However, in the system 350, the sensor 302 includes a plurality of sensors 302-1, 302-2 . . . 302-N. The processor 120 is communicably coupled with the plurality of sensors 302-1, 302-2 . . . 302-N.

Figure 4:
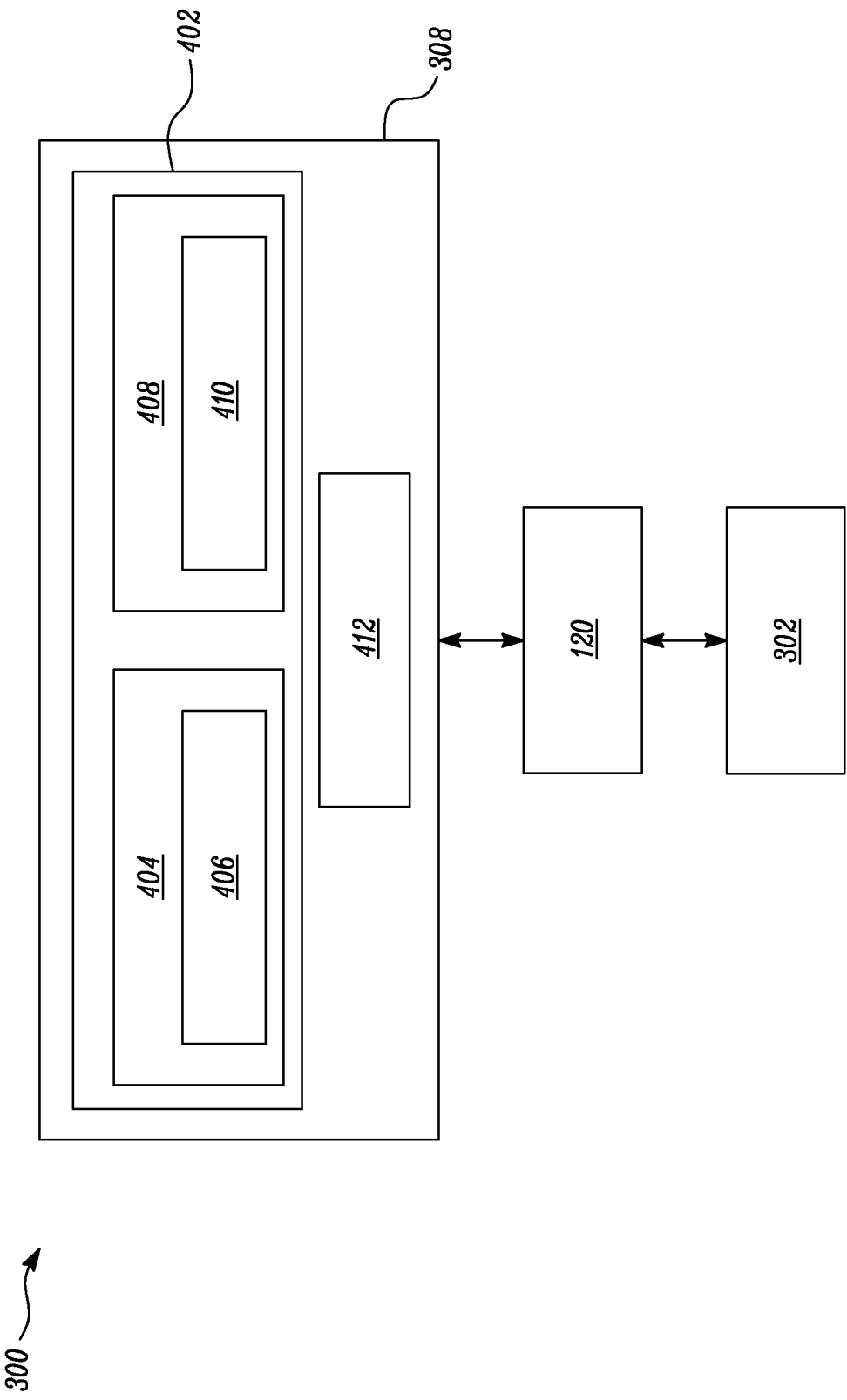
FIG. 4 is a detailed functional block diagram of the system of FIG. 3A, according to an embodiment of the present disclosure.

FIG. 4 illustrates a detailed functional block diagram of the system 300, according to an embodiment of the present disclosure. For illustrative purposes, some components of the system 300 are not shown in FIG. 4. The memory 308 includes a driver profile 402 corresponding to the driver of the vehicle 100 (shown in FIG. 1). The memory 308 stores a stored driver distribution profile 404 of a driver input parameter.

In some embodiments, the driver input parameter pertains to a behavior of the driver of the vehicle 100. In some embodiments, the driver input parameter includes at least one of a position of an accelerator pedal of the vehicle 100, a first time derivative, and a second time derivative thereof. In other words, the driver input parameter includes at least one of the position of the accelerator pedal, and a rate of movement of the accelerator pedal. Therefore, the driver input parameter may pertain to a behavior of the driver of the vehicle 100 with respect to the manner in which the driver controls a throttle position of the vehicle 100.

In some embodiments, the driver input parameter includes at least one of a steering wheel angle of the vehicle 100, a first time derivative, and a second time derivative thereof. In other words, the driver input parameter includes at least one of the position of the steering wheel, and a rate of movement of the steering wheel. Therefore, the driver input parameter may pertain to a behavior of the driver of the vehicle 100 with respect to a manner in which the driver controls a direction of motion of the vehicle 100.

In some embodiments, the driver input parameter includes at least one of a brake pedal pressure of the vehicle 100, a first time derivative, and a second time derivative thereof. In other words, the driver input parameter includes at least one of a position of the brake pedal, and a rate of movement of the brake pedal. Therefore, the driver input parameter may pertain to a behavior of the driver of the vehicle 100 with respect to a manner in which the driver controls a braking of the vehicle 100.

In some embodiments, the driver input parameter pertains to a motion attribute of the vehicle 100. In some embodiments, the driver input parameter includes at least a speed of the vehicle 100. In some embodiments, the driver input parameter includes at least one of a longitudinal acceleration of the vehicle 100 and a first time derivative thereof. In other words, the driver input parameter includes at least one of an acceleration of the vehicle 100 along a longitudinal axis of the vehicle 100 and a rate of change of the acceleration of the vehicle 100 along the longitudinal axis of the vehicle 100.

In some embodiments, the driver input parameter includes at least one of a lateral acceleration of the vehicle 100 and a first time derivative thereof. In other words, the driver input parameter includes at least one of an acceleration of the vehicle 100 along a lateral axis of the vehicle 100 and a rate of change of the acceleration of the vehicle 100 along the lateral axis of the vehicle 100.

In some embodiments, the driver input parameter includes a gear position of the vehicle 100. In some embodiments, the driver input parameter includes an engine speed of the vehicle 100.

Therefore, in some embodiments, the driver input parameter includes at least one of the position of the accelerator pedal of the vehicle 100, the first time derivative of the accelerator pedal of the vehicle 100, the second time derivative of the accelerator pedal of the vehicle 100, the steering wheel angle of the vehicle 100, the first time derivative of the steering wheel angle of the vehicle 100, the second time derivative of the steering wheel angle of the vehicle 100, the brake pedal pressure of the vehicle 100, the first time derivative of the brake pedal pressure of the vehicle 100, the second time derivative of the brake pedal pressure of the vehicle 100, the speed of the vehicle 100, the longitudinal acceleration of the vehicle 100, the first time derivative of the longitudinal acceleration of the vehicle 100, the lateral acceleration of the vehicle 100, the first time derivative of the lateral acceleration of the vehicle 100, the gear position of the vehicle 100, and the engine speed of the vehicle 100.

In some embodiments, the stored driver distribution profile 404 includes a stored distribution function 406 of the driver input parameter. In some embodiments, the stored distribution function 406 may be determined based on a variation of the driver input parameter with respect to time.

In some embodiments, the stored distribution function 406 is determined based on a variation of the driver input parameter over a period of time. For example, the stored distribution function 406 can be a function of a moving average value of the driver input parameter over the period of time. The period of time may be any, such as 1 day, 7 days, 10 days, 20 days, 30 days, 40 days, 60 days etc.

Figure 5A:
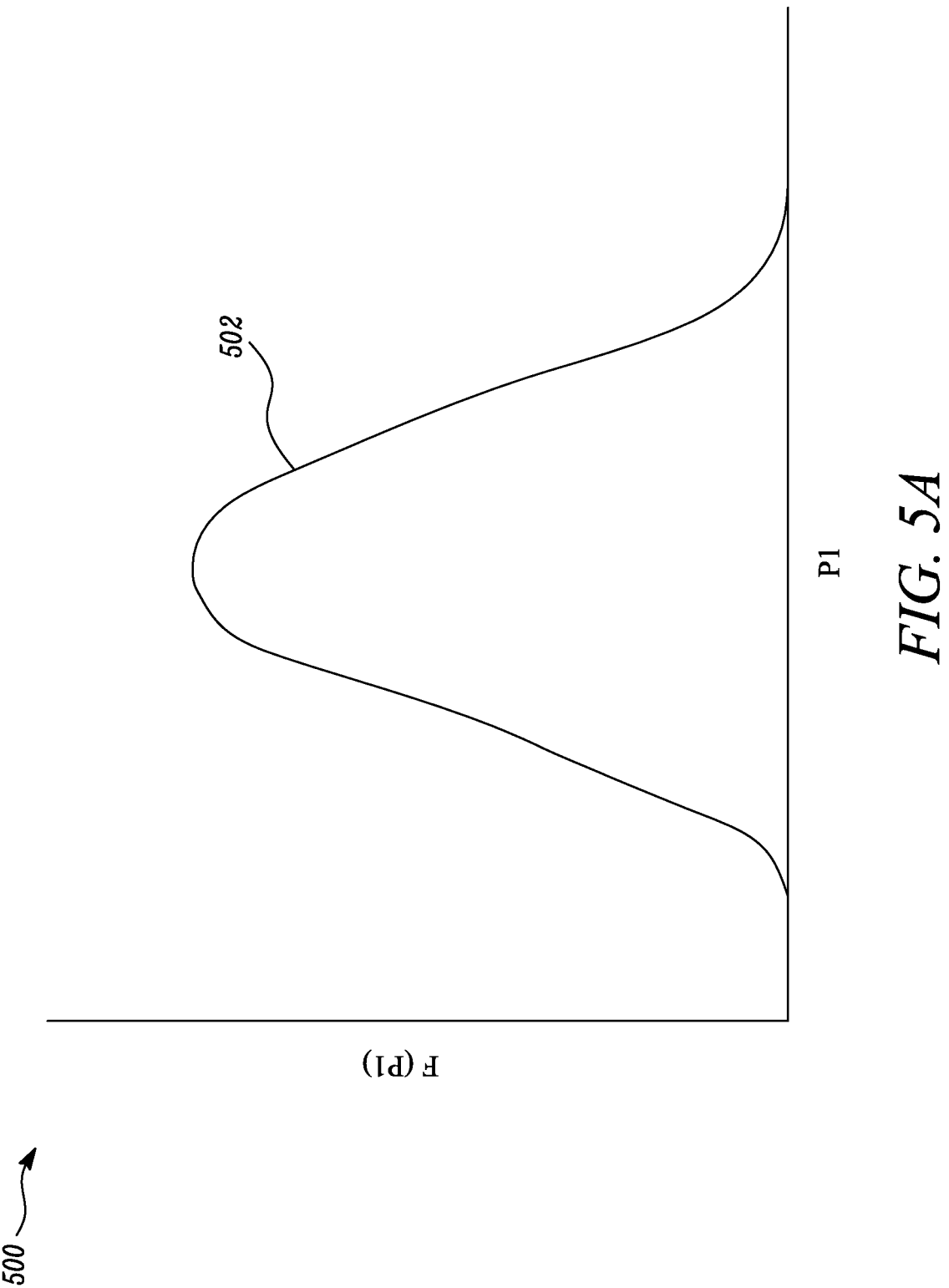
FIG. 5A is a plot depicting a stored distribution function of a driver input parameter of the vehicle, according to an embodiment of the present disclosure.

FIG. 5A illustrates a plot 500 depicting a graphical representation of the stored distribution function 406 (shown in FIG. 4) of a driver input parameter P1 of the vehicle 100 (shown in FIG. 1), according to an embodiment of the present disclosure. The stored distribution function 406 is depicted by a curve 502. The stored distribution function 406 is depicted as a function of the driver input parameter P1 in arbitrary units (a.u.) on the left ordinate, and the driver input parameter P1 of the vehicle 100 is depicted in arbitrary units (a.u.) on the abscissa. In the illustrated embodiment of FIG. 5A, the stored distribution function 406 of the driver input parameter P1 of the vehicle 100 is a continuous function, as depicted by the curve 502.

Referring again to FIG. 4, the memory 308 stores a stored suspension setting 408 corresponding to the stored driver distribution profile 404. Each of the stored driver distribution profile 404 and the stored suspension setting 408 corresponds to the driver of the vehicle 100.

In some embodiments, the memory 308 further stores a default suspension setting 412. The default suspension setting 412 relates to a setting of the shock absorbers 112 of the vehicle 100 before generation and storage of the stored driver distribution profile 404 in the memory 308. In some cases, the default suspension setting 412 may be a suspension setting stored in the memory 308 by a manufacturer or a dealer of the vehicle 100. In some embodiments, the processor 120 is configured to control the one or more shock absorbers 112 of the vehicle 100 based on the default suspension setting 412 prior to storage of the stored driver distribution profile 404 corresponding to the driver in the memory 308. For example, the default suspension setting 412 is used when the driver operates the vehicle 100 for the first time without any prior driving history stored in the driver profile 402.

In some embodiments the stored suspension setting 408 includes a stored suspension function 410. The stored suspension function 410 may be a variation of damping characteristics of the shock absorbers 112 of the vehicle 100 in response to the stored distribution function 406, such that the variation of the damping characteristics of the shock absorbers 112 provides desired driving attributes to the driver of the vehicle 100. The desired driving attributes may be related to a performance of the suspension system 102 of the vehicle 100 and may include traction force, anti-roll over protection, ride control, electronic stability program, and so on.

Figure 5B:
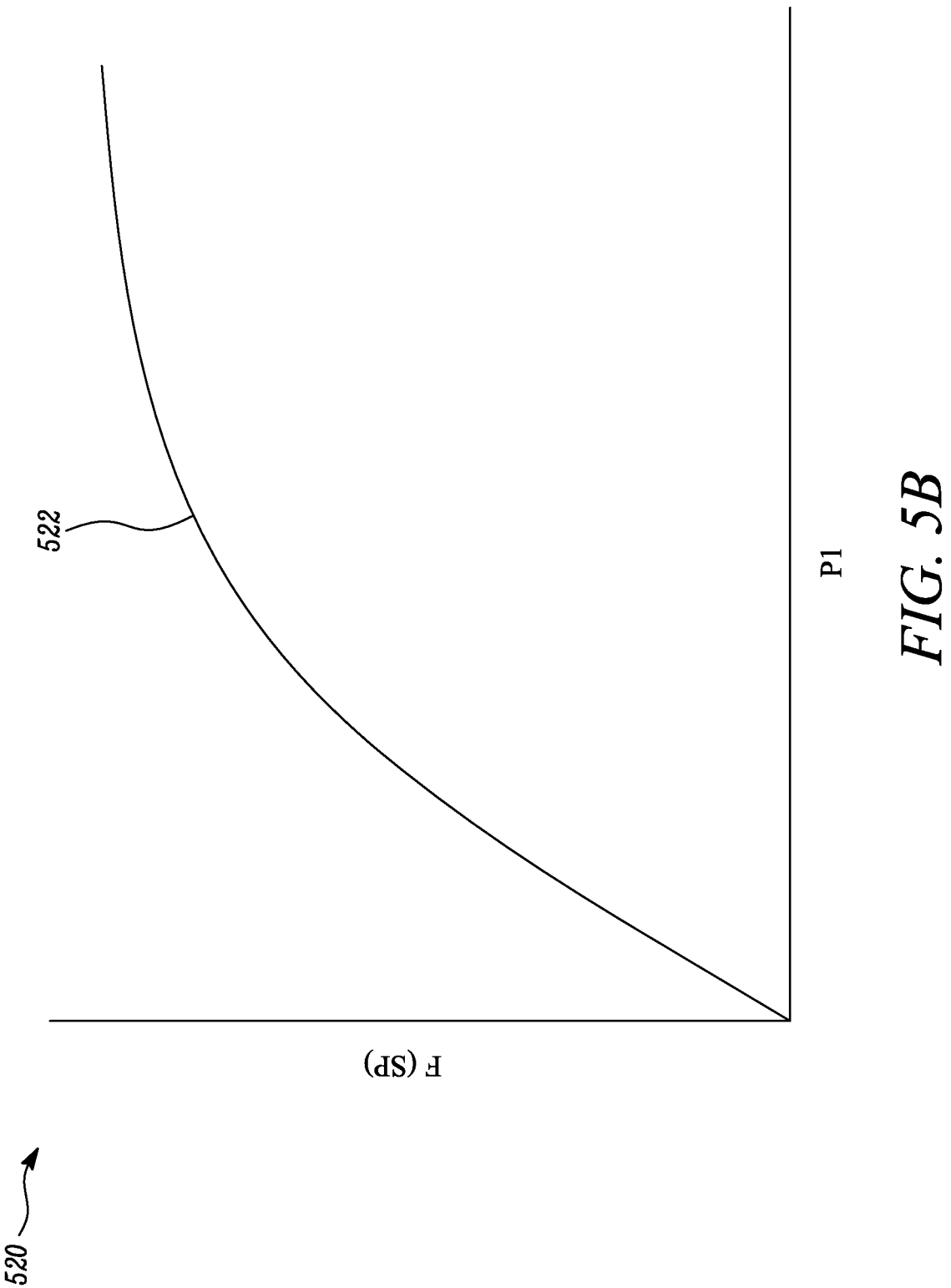
FIG. 5B is a plot depicting a stored suspension function corresponding to the stored distribution function of FIG. 5A, according to an embodiment of the present disclosure.

FIG. 5B illustrates a plot 520 depicting a graphical representation of the stored suspension function 410 corresponding to the stored distribution function 406 depicted by the curve 502 of FIG. 5A, according to an embodiment of the present disclosure. As shown in FIG. 5B, the stored suspension function 410 is depicted by a suspension curve 522. The stored suspension function 410 is depicted as a function of a suspension parameter SP in arbitrary units (a.u.) on the left ordinate, and the driver input parameter P1 of the vehicle 100 is depicted in arbitrary units (a.u.) on the abscissa. The suspension parameter SP may include at least one of a hydraulic fluid pressure in the shock absorbers 112, the input current Ic, spring mass associated with each of the shock absorbers 112, a damping coefficient of the shock absorbers 112, a type of shock absorbers 112 (CVSA, passive, active), a valve characteristic of the electronic valve 214 (shown in FIG. 2), and so on. In some cases, the suspension parameter SP can be a valve pressure or a valve flow of the electronic valve 214. In some cases, the stored suspension function 410 may be depicted as a variation of the damping force on the shock absorbers 112 with respect to the driver input parameter P1. In some other cases, the stored suspension function 410 may be depicted as a variation of the valve pressure with respect to the valve flow of the electronic valve 214.

Figure 6A:
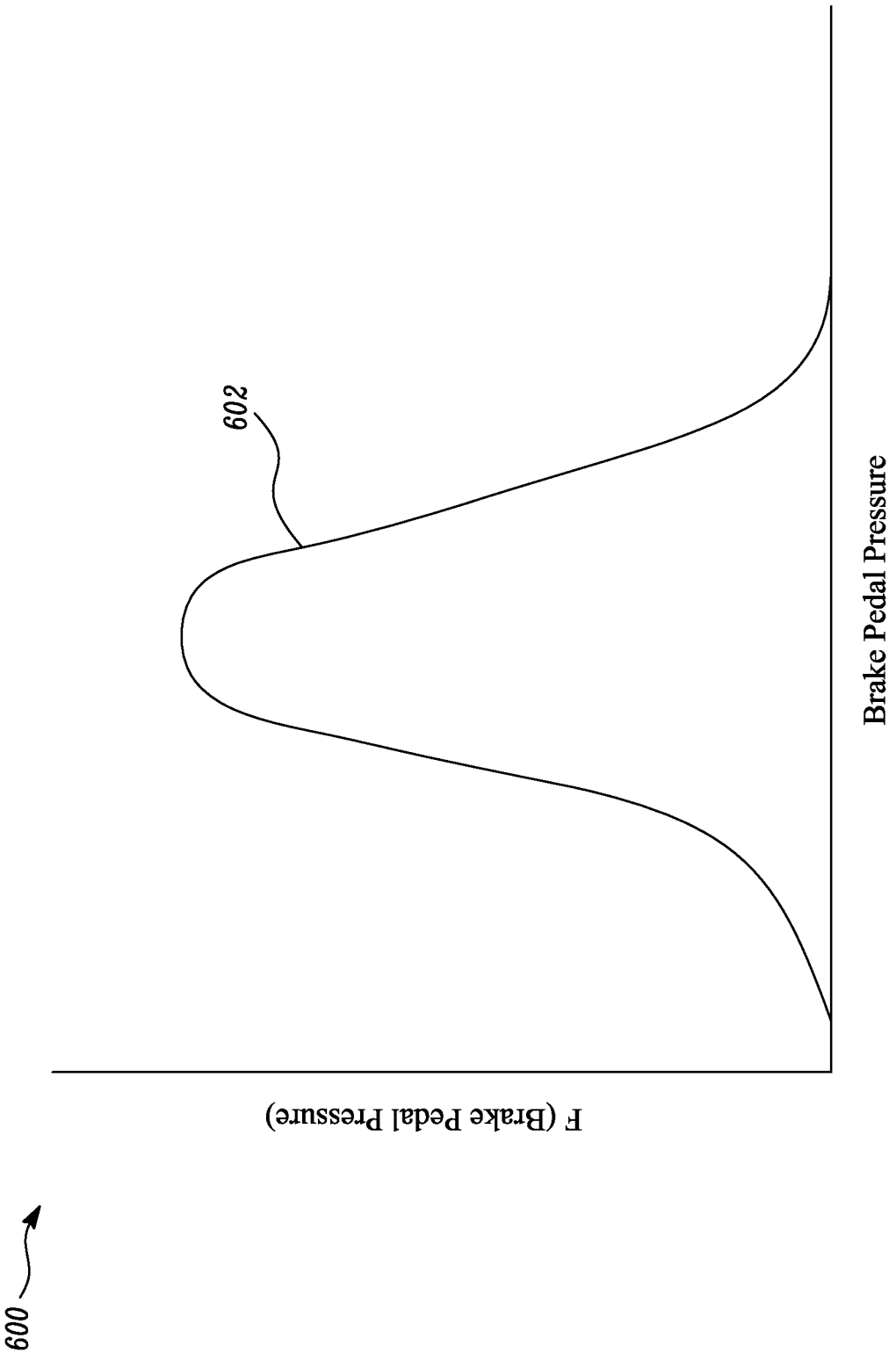
FIG. 6A is a plot depicting a stored distribution function of a brake pedal pressure of the vehicle, according to an embodiment of the present disclosure.

FIG. 6A illustrates a plot 600 depicting a graphical representation of the stored distribution function 406 of a driver input parameter, such as the brake pedal pressure of the vehicle 100 (shown in FIG. 1), according to an embodiment of the present disclosure. The stored distribution function 406 is depicted by a pressure curve 602. The stored distribution function 406 is depicted as a function of the brake pedal pressure in arbitrary units (a.u.) on the left ordinate, and the brake pedal pressure of the vehicle 100 is depicted in arbitrary units (a.u.) on the abscissa. In the illustrated example of FIG. 6A, the stored distribution function 406 of the brake pedal pressure of the vehicle 100 is a continuous function, as depicted by the pressure curve 602.

In some cases, the stored distribution function 406 of the brake pedal pressure (driver input parameter) may be based on a pressure applied on a brake pedal of the vehicle 100.

Figure 6B:
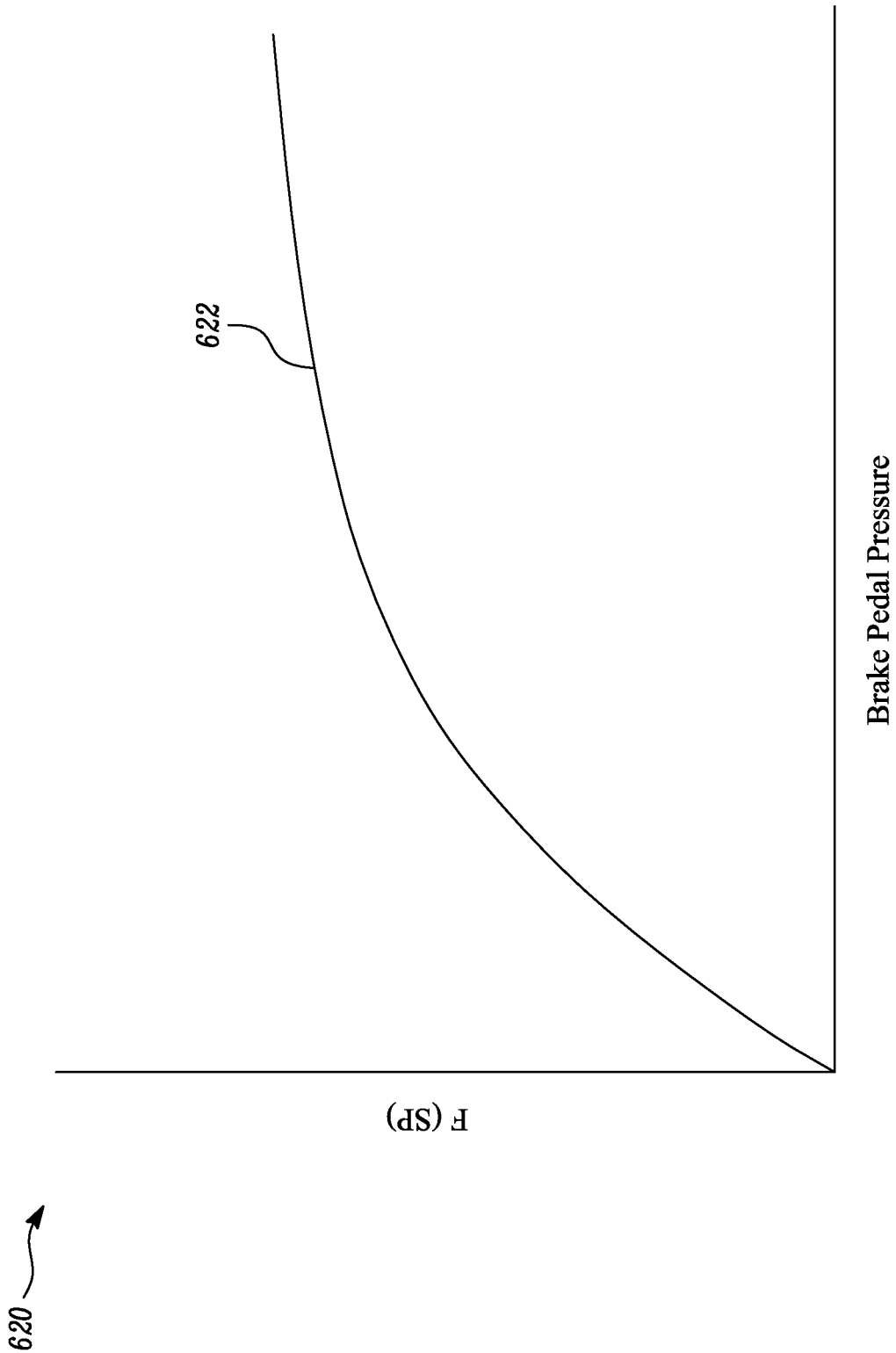
FIG. 6B is a depicting a stored suspension function corresponding to the stored distribution function of FIG. 6A, according to an embodiment of the present disclosure.

FIG. 6B illustrates a plot 620 depicting a graphical representation of the stored suspension function 410 corresponding to the stored distribution function 406 depicted by the pressure curve 602 of FIG. 6A, according to an embodiment of the present disclosure. As shown in FIG. 6B, the stored suspension function 410 is depicted by a suspension curve 622. The stored suspension function 410 may be depicted as a variation of the damping force on the shock absorbers 112 with respect to the brake pedal pressure of the vehicle 100. The stored suspension function 410 is depicted as a function of the suspension parameter SP in arbitrary units (a.u.) on the left ordinate, and the brake pedal pressure of the vehicle 100 is depicted in arbitrary units (a.u.) on the abscissa.

Referring to FIGS. 6A and 6B, when the pressure applied on the brake pedal is increased, the wheels 110, 116 move slower relative to the body 104 of the vehicle 100 due to a braking force applied on the wheels. A corrective action may be to increase the damping force of the shock absorbers 112.

Figure 6C:
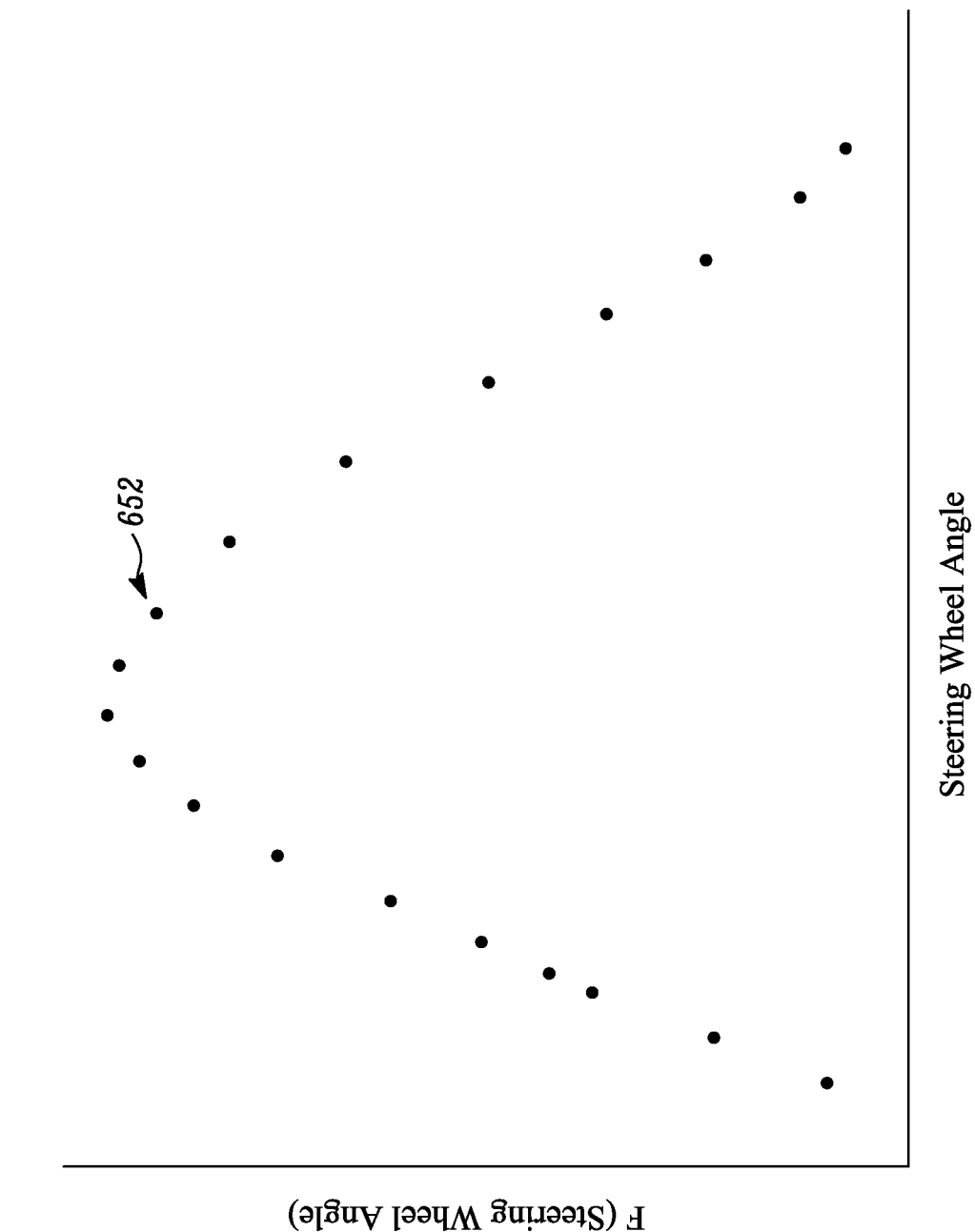
FIG. 6C is a plot depicting a stored distribution function of a steering wheel angle of the vehicle, according to an embodiment of the present disclosure.

FIG. 6C illustrates a plot 650 depicting a graphical representation of the stored distribution function 406 of a driver input parameter, such as the steering wheel angle of the vehicle 100 (shown in FIG. 1), according to an embodiment of the present disclosure. The stored distribution function 406 is depicted by a steering angle plot 652. The stored distribution function 406 is depicted as a function of steering wheel angle in arbitrary units (a.u.) on the left ordinate, and the steering wheel angle of the vehicle 100 is depicted in arbitrary units (a.u.) on the abscissa. In the illustrated example of FIG. 6C, the stored distribution function 406 of the steering wheel angle of the vehicle 100 is a discrete function, as depicted by the steering angle plot 652.

In some cases, the stored distribution function 406 of the steering wheel angle (driver input parameter) may be based on a rate of change of the steering wheel angle of the vehicle 100.

Figure 6D:
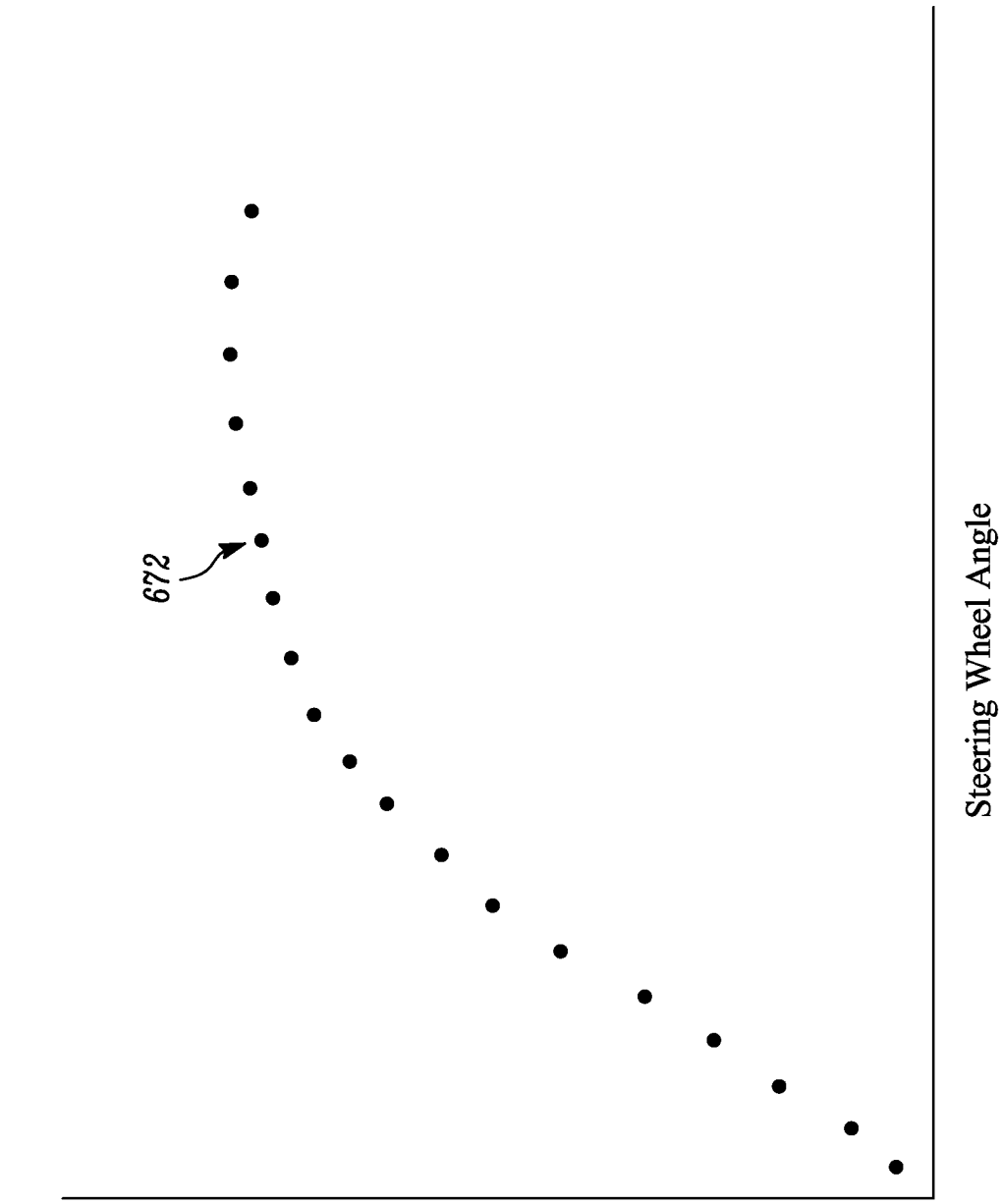
FIG. 6D is a plot depicting a stored suspension function corresponding to the stored distribution function of FIG. 6C, according to an embodiment of the present disclosure.

FIG. 6D illustrates a plot 670 depicting a graphical representation of the stored suspension function 410 corresponding to the stored distribution function 406 depicted by the steering angle plot 652 of FIG. 6C, according to an embodiment of the present disclosure. As shown in FIG. 6D, the stored suspension function 410 is depicted by a suspension plot 672. The stored suspension function 410 may be depicted as a variation of the damping force on the shock absorbers 112 with respect to the steering wheel angle of the vehicle 100. The stored suspension function 410 is depicted as a function of the suspension parameter SP in arbitrary units (a.u.) on the left ordinate, and the steering wheel angle of the vehicle 100 is depicted in arbitrary units (a.u.) on the abscissa.

Referring to FIGS. 6C and 6D, when the steering wheel angle is increased, there is an increased rolling force on the vehicle 100 towards the direction of rotation of the steering wheel. A corrective action may be to increase the damping force of the shock absorbers 112.

FIG. 7 illustrates another detailed functional block diagram of the system 300, according to another embodiment of the present disclosure. In the illustrated embodiment of FIG. 7, the memory 308 includes a plurality of driver profiles 402-1, 402-2 ... 402-N corresponding to respective plurality of drivers (not shown) of the vehicle 100. Each of the plurality of driver profiles 402-1, 402-2 ... 402-N further includes respective stored driver distribution profiles 404-1, 404-2 ... 404-N of the driver input parameter and respective stored suspension settings 408-1, 408-2 ... 408-N corresponding to the stored driver distribution profiles 404-1, 404-2 ... 404-N.

In some embodiments, the driver input parameter corresponding to the stored driver distribution profiles 404-1, 404-2 ... 404-N includes at least one of the position of the accelerator pedal of the vehicle 100, the first time derivative of the accelerator pedal of the vehicle 100, the second time derivative of the accelerator pedal of the vehicle 100, the steering wheel angle of the vehicle 100, the first time derivative of the steering wheel angle of the vehicle 100, the second time derivative of the steering wheel angle of the vehicle 100, the brake pedal pressure of the vehicle 100, the first time derivative of the brake pedal pressure of the vehicle 100, the second time derivative of the brake pedal pressure of the vehicle 100, the speed of the vehicle 100, the longitudinal acceleration of the vehicle 100, the first time derivative of the longitudinal acceleration of the vehicle 100, the lateral acceleration of the vehicle 100, the first time derivative of the lateral acceleration of the vehicle 100, the gear position of the vehicle 100, and the engine speed of the vehicle 100.

In some embodiments, the stored driver distribution profiles 404-1, 404-2 ... 404-N may include respective stored distribution functions (not shown) of the driver input parameter. In some embodiments, the stored suspension settings 408-1, 408-2 ... 408-N may include respective stored suspension functions (not shown).

Figure 8:
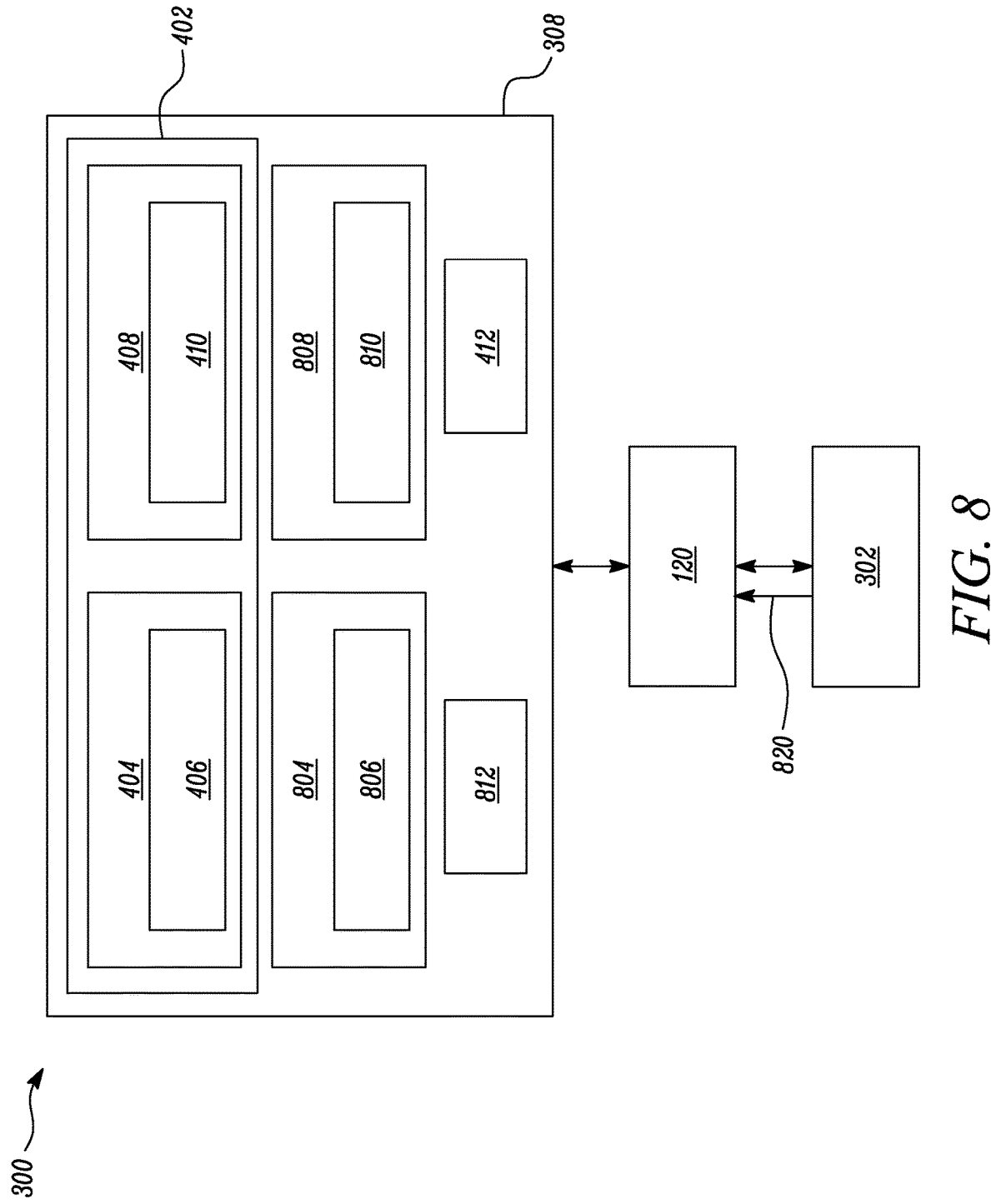
FIG. 8 is another detailed functional block diagram of the system of FIG. 3A, according to an embodiment of the present disclosure.

FIG. 8 illustrates another detailed functional block diagram of the system 300 of FIG. 3A, according to an embodiment of the present disclosure. For illustrative purposes, some components of the system 300 are not shown in FIG. 8. The system 300 is implementable by the processor 120, when the processor 120 executes the set of instructions 312 (shown in FIGS. 3A and 3B) stored in the memory 308. Further, the system 300 is implementable upon receiving, by the processor 120, a current value of the driver input parameter.

The sensor 302 detects the current value of the driver input parameter while the driver is driving the vehicle 100 (shown in FIG. 1). Specifically, the sensor 302 generates a set of signals 820 indicative of the current value of the driver input parameter while the driver is driving the vehicle 100. Thereafter, the processor 120 receives the current value of the driver input parameter while the driver is driving the vehicle 100.

The processor 120 is configured to determine a current driver distribution profile 804 of the driver input parameter based on the current value of the driver input parameter. In some embodiments, the current driver distribution profile 804 includes a current distribution function 806 of the driver input parameter. The current driver distribution profile 804 may be temporarily stored in the memory 308 by the processor 120.

Figure 9A:
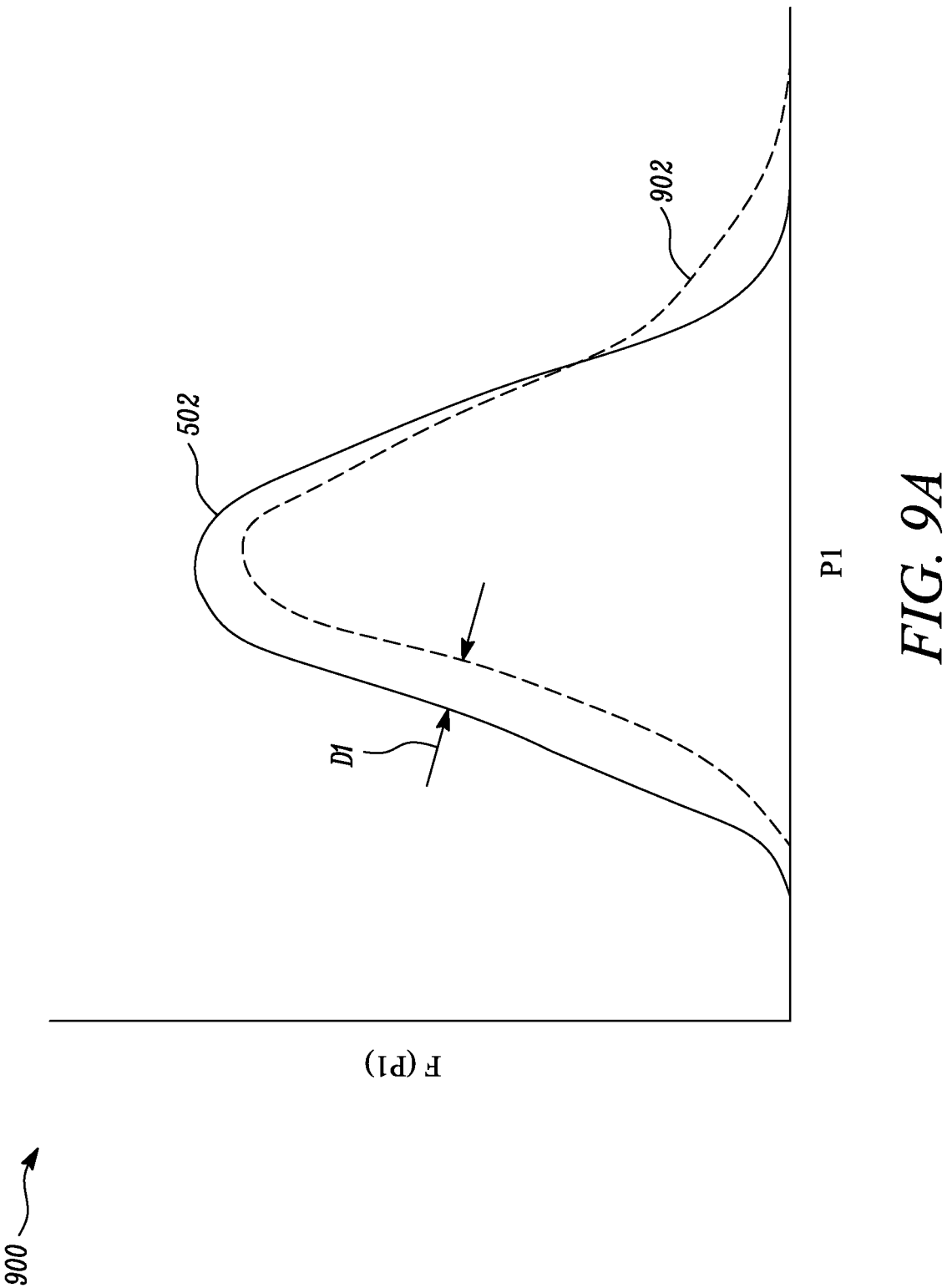
FIG. 9A is a plot depicting a current distribution function of the driver input parameter corresponding to FIG. 5A, according to an embodiment of the present disclosure.

FIG. 9A illustrates a plot 900 depicting a graphical representation of the stored distribution function 406 (also shown in FIG. 5A) and the current distribution function 806 (shown in FIG. 8) of the driver input parameter P1 of the vehicle 100 (shown in FIG. 1), according to an embodiment of the present disclosure. The stored distribution function 406 is depicted by the curve 502 of FIG. 5A, and the current distribution function 806 is depicted by a curve 902. As illustrated in the plot 900, the curve 902 is different from the curve 502.

Referring to FIGS. 8 and 9A, in some embodiments, the processor 120 is further configured to determine an anomaly score 812 between the stored distribution function 406 and the current distribution function 806. In an example, the anomaly score 812 between the stored distribution function 406 and the current distribution function 806 may be a variation or a fluctuation or a difference between the stored distribution function 406 and the current distribution function 806. In some embodiments, the anomaly score 812 between the stored distribution function 406 and the current distribution function 806 is depicted by an average deviation D1 between the curve 502 and the curve 902. In the illustrated embodiment of FIG. 9A, the stored distribution function 406 and the current distribution function 806 are continuous functions.

In general, in an operation, an anomaly score or an anomaly level is calculated from a deviation between a prediction result and an observation result. In many cases, a threshold for the anomaly score is set and used for determining an anomaly based on whether an anomaly score exceeds the threshold. A high anomaly score may mean that the observation result significantly deviates from the prediction result. Therefore, with reference to FIG. 8, if the anomaly score 812 between the stored distribution function 406 and the current distribution function 806 is greater than a predetermined threshold, it may be inferred that the current distribution function 806 significantly deviates from the stored distribution function 406. Similarly, if the anomaly score 812 between the stored distribution function 406 and the current distribution function 806 is less than the predetermined threshold, it may be inferred that the current distribution function 806 slightly deviates from the stored distribution function 406.

After the processor 120 determines the anomaly score 812 (i.e., the average deviation D1) between the stored distribution function 406 and the current distribution function 806, the processor 120 is configured to determine a deviation between the current driver distribution profile 804 and the stored driver distribution profile 404. Therefore, the processor 120 is further configured to determine the anomaly score 812 (i.e., the average deviation D1) between the stored distribution function 406 and the current distribution function 806 in order to determine the deviation between the current driver distribution profile 804 and the stored driver distribution profile 404.

Referring again to FIG. 8, in some embodiments, the processor 120 is configured to determine a current suspension setting 808 based on the current driver distribution profile 804, if the deviation is greater than the predetermined threshold. In some embodiments, the processor 120 is further configured to determine the current suspension setting 808 based on the current driver distribution profile 804, if the anomaly score 812 is greater than the predetermined threshold.

In some embodiments, the current suspension setting 808 includes a current suspension function 810. In some embodiments, the processor 120 is configured to determine the current suspension function 810 if the anomaly score 812 between the stored distribution function 406 and the current distribution function 806 is greater than the predetermined threshold.

Figure 9B:
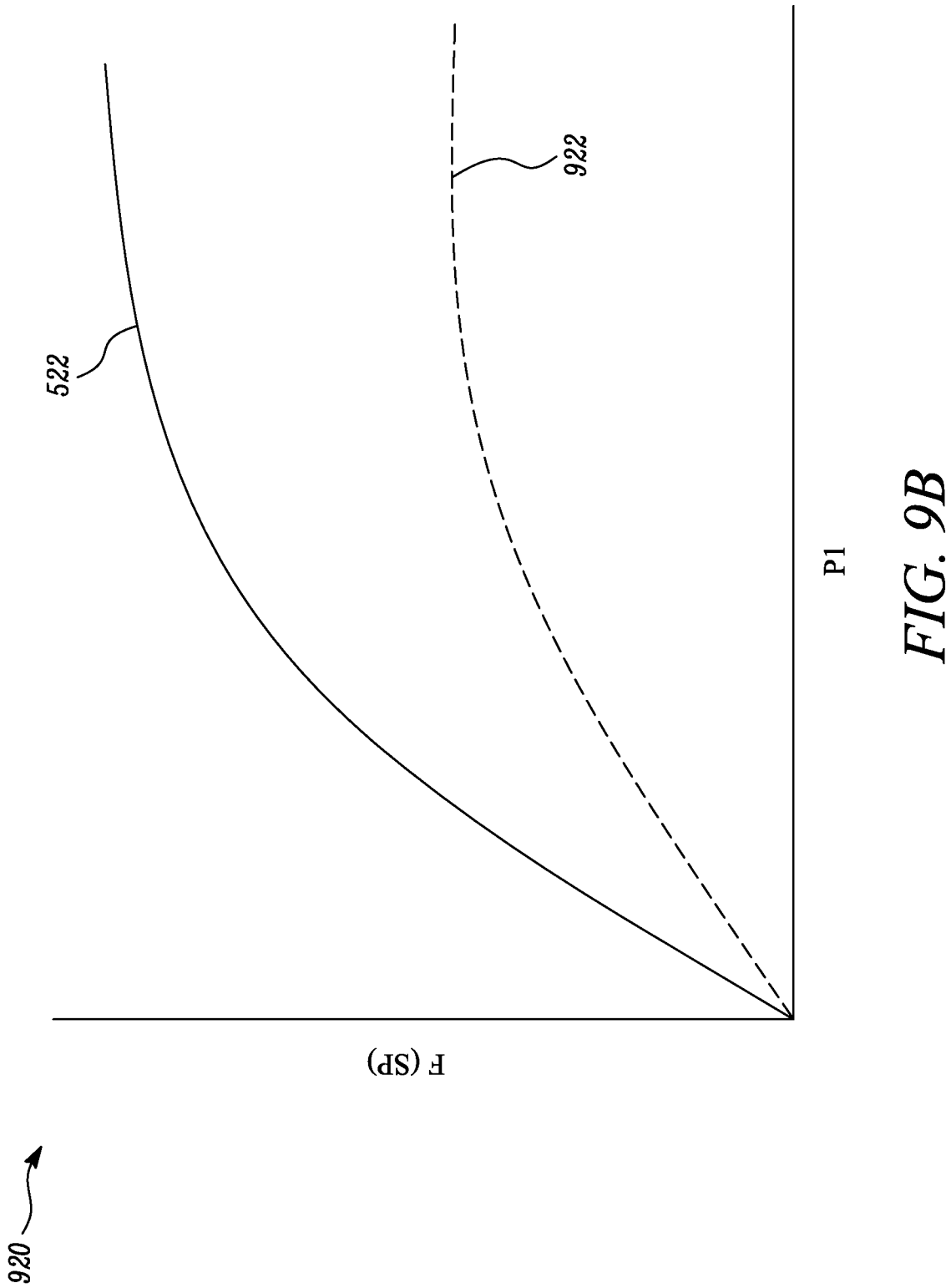
FIG. 9B is a plot depicting a current suspension function corresponding to the current distribution function of FIG. 9A, according to an embodiment of the present disclosure.

FIG. 9B illustrates a plot 920 depicting a graphical representation of the stored suspension function 410 (also depicted by the suspension curve 522 of FIG. 5B) and the current suspension function 810, according to an embodiment of the present disclosure. The current suspension function 810 is depicted by a suspension curve 922. Further, the current suspension function 810 (depicted by the suspension curve 922) is determined by the processor 120 based on the current distribution function 806 (depicted by the curve 902). It is apparent from FIG. 9B that the current suspension function 810 is different from the stored suspension function 410.

FIG. 10A illustrates a plot 1000 depicting a graphical representation of the stored distribution function 406 (also shown in FIG. 6A) and the current distribution function 806 of the driver input parameter, such as the brake pedal pressure of the vehicle 100 (shown in FIG. 1), according to an embodiment of the present disclosure. The stored distribution function 406 is depicted by the pressure curve 602 of FIG. 6A, and the current distribution function 806 is depicted by a pressure curve 1002. As illustrated in the plot 1000, the pressure curve 1002 is different from the pressure curve 602. In the illustrated embodiment of FIG. 10A, the stored distribution function 406 and the current distribution function 806 are continuous functions.

Referring to FIGS. 8 and 10A, in some embodiments, the processor 120 is further configured to determine the anomaly score 812 between the stored distribution function 406 (depicted by the pressure curve 602) and the current distribution function 806. In some embodiments, the anomaly score 812 between the stored distribution function 406 and the current distribution function 806 is depicted by an average deviation D2 between the pressure curve 602 and the pressure curve 1002.

Figure 10B:
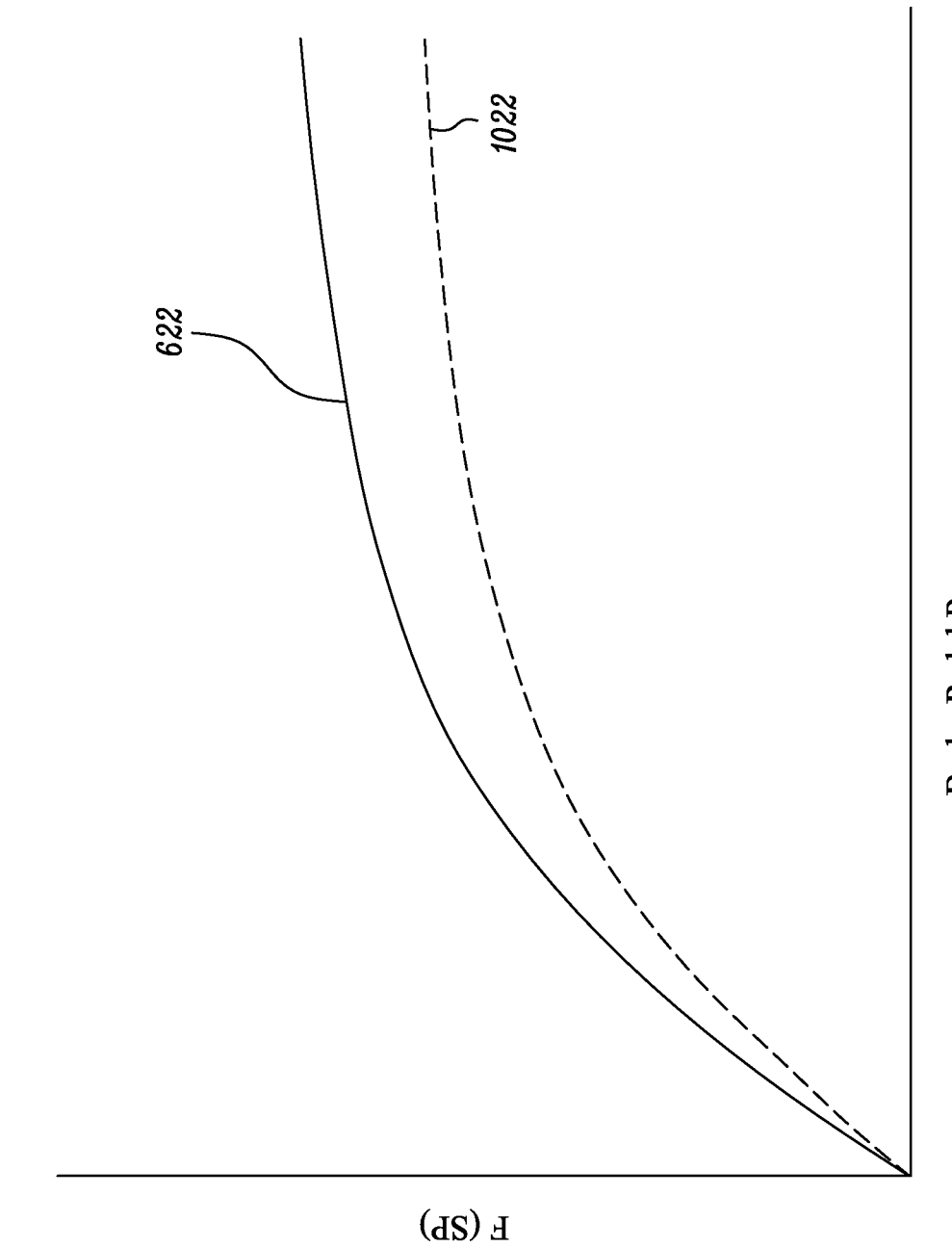
FIG. 10B is a plot depicting a current suspension function corresponding to the current distribution function of FIG. 10A, according to an embodiment of the present disclosure.

FIG. 10B illustrates a plot 1020 depicting a graphical representation of the stored suspension function 410 (also depicted by the suspension curve 622 in FIG. 6B) and the current suspension function 810, according to an embodiment of the present disclosure. The current suspension function 810 is depicted by a suspension curve 1022. Further, the current suspension function 810 (depicted by the suspension curve 1022) is determined by the processor 120 based on the current distribution function 806 (depicted by the pressure curve 1002 in FIG. 10A). As illustrated in the plot 1020, the suspension curve 1022 is different from the suspension curve 622.

Figure 10C:
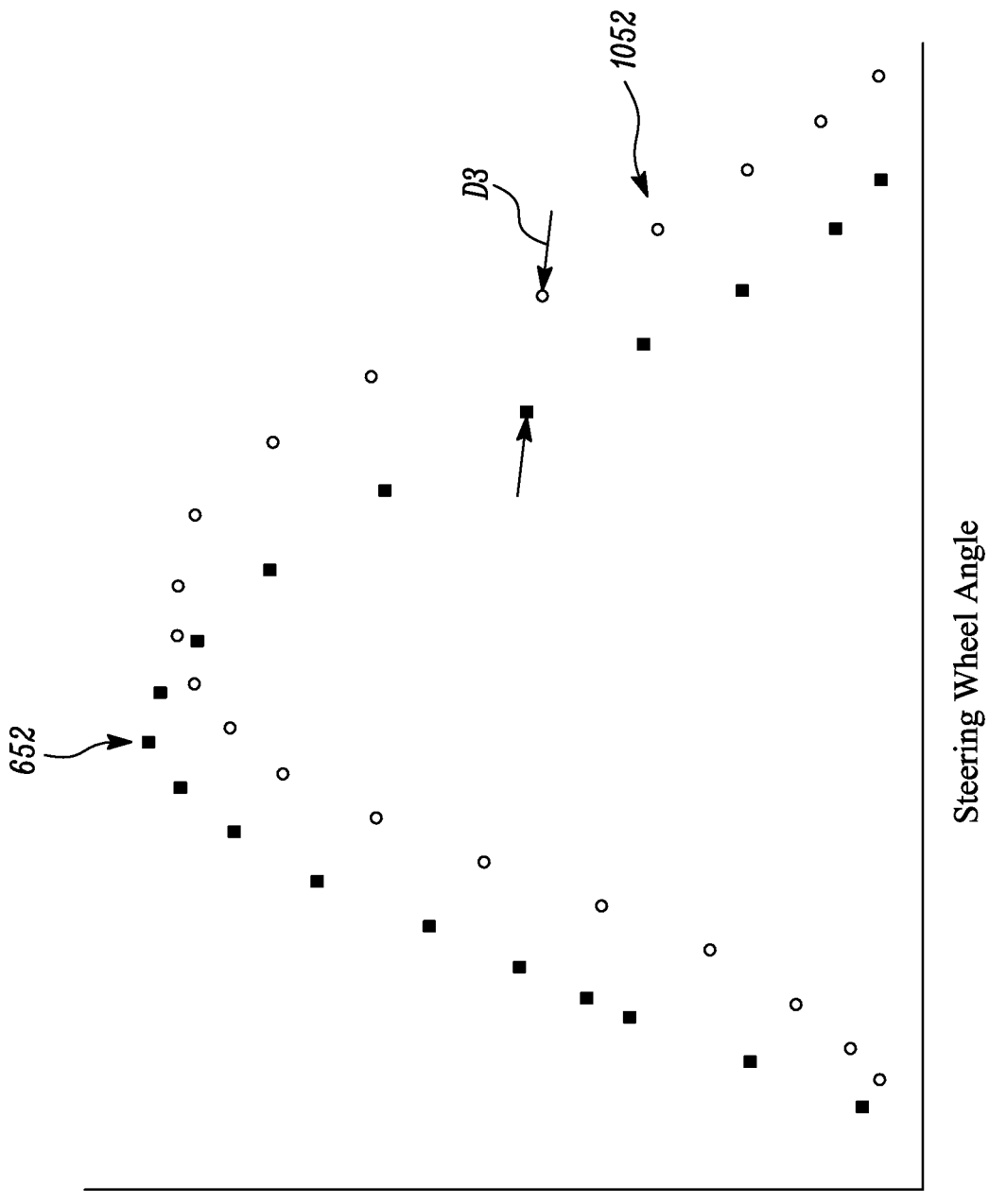
FIG. 10C is a plot depicting a current distribution function of the steering wheel angle of the vehicle, according to an embodiment of the present disclosure.

FIG. 10C illustrates a plot 1050 depicting a graphical representation of the stored distribution function 406 (also shown in FIG. 6C) and the current distribution function 806 of the driver input parameter, such as the steering wheel angle of the vehicle 100 (shown in FIG. 1), according to an embodiment of the present disclosure. The stored distribution function 406 is depicted by the steering angle plot 652 of FIG. 6C, and the current distribution function 806 is depicted by a steering angle plot 1052. As illustrated in the plot 1050, the steering angle plot 1052 is different from the steering angle plot 652.

Referring to FIGS. 8 and 10C, in some embodiments, the processor 120 is further configured to determine the anomaly score 812 between the stored distribution function 406 (depicted by the steering angle plot 652) and the current distribution function 806. In some embodiments, the anomaly score 812 between the stored distribution function 406 and the current distribution function 806 is depicted by an average deviation D3 between the steering angle plot 652 and the steering angle plot 1052. In the illustrated embodiment of FIG. 10C, the stored distribution function 406 and the current distribution function 806 are discrete functions. However, in some embodiments, the stored distribution function 406 and the current distribution function 806 may be any type of non-continuous functions. Therefore, in some cases, the anomaly score 812 may be determined between a non-continuous stored distribution function 406 and a non-continuous current distribution function 806. Furthermore, an average deviation may be depicted between a curve corresponding to the non-continuous stored distribution function 406 and a curve corresponding to the non-continuous current distribution function 806.

FIG. 10D illustrates a plot 1070 depicting a graphical representation of the stored suspension function 410 (also depicted by suspension plot 672 in FIG. 6D) and the current suspension function 810, according to an embodiment of the present disclosure. The current suspension function 810 is depicted by a suspension plot 1072. Further, the current suspension function 810 (depicted by the suspension plot 1072) is determined by the processor 120 based on the current distribution function 806 (depicted by the steering angle plot 1052 in FIG. 10C). It may be apparent from FIG. 10D that the suspension plot 1072 is different from the suspension plot 672.

With reference to FIG. 8, in some cases, if the deviation between the current driver distribution profile 804 and the stored driver distribution profile 404 is less than or equal to the predetermined threshold, the processor 120 may not determine the current suspension setting 808. In other words, the processor 120 may not determine the current suspension setting 808 if the anomaly score 812 between the stored distribution function 406 and the current distribution function 806 is less than or equal to the predetermined threshold. In such cases, the processor 120 controls the one or more shock absorbers 112 of the vehicle 100 based on the stored suspension setting 408.

Figure 11:
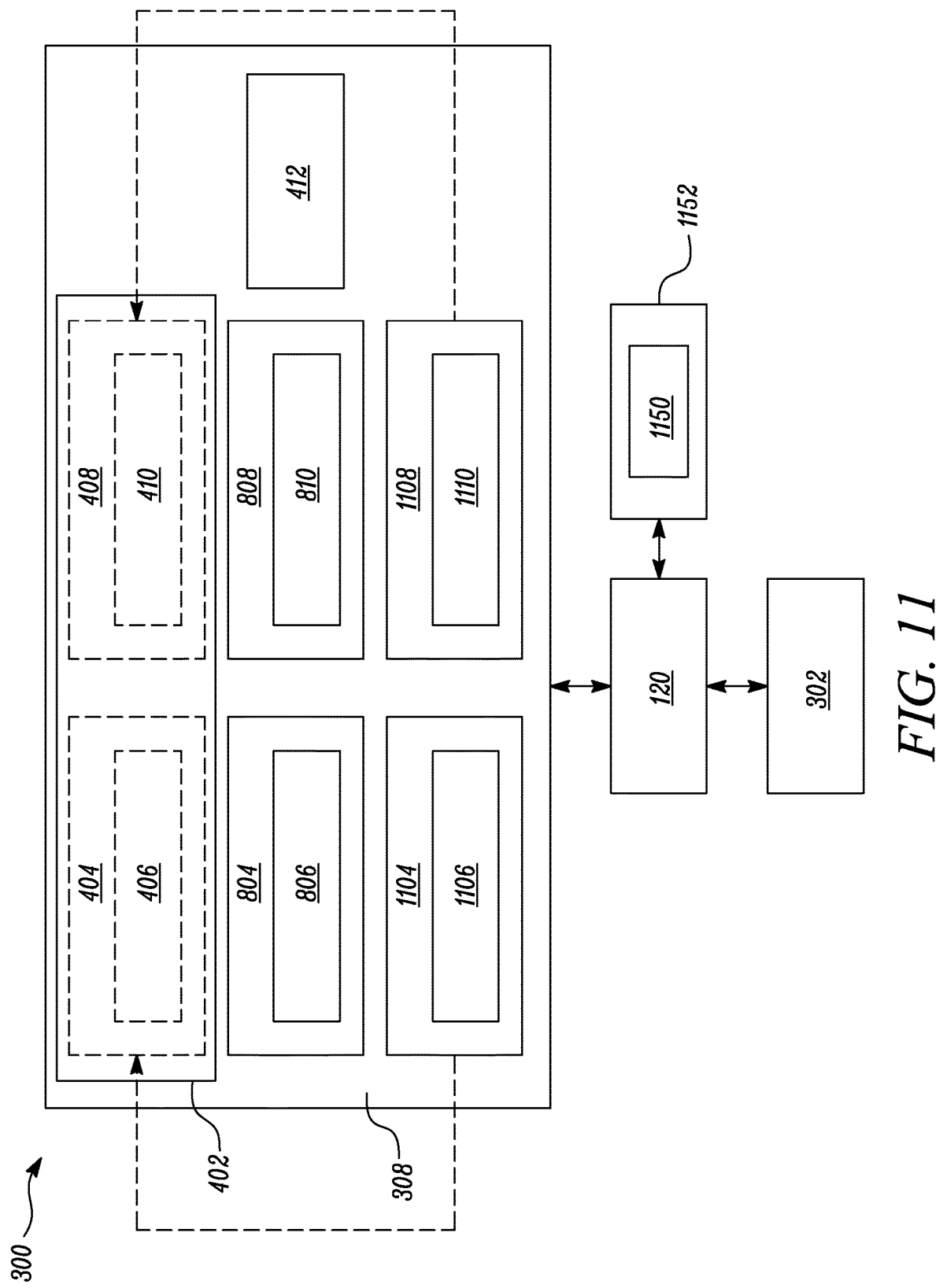
FIG. 11 is another detailed functional block diagram of the system of FIG. 3A, according to an embodiment of the present disclosure.

FIG. 11 illustrates another functional block diagram of the system 300, according to an embodiment of the present disclosure. For illustrative purposes, some components of the system 300 are not shown in FIG. 11. The system 300 is implementable by the processor 120, when the processor 120 executes the set of instructions 312 (shown in FIG. 3A) stored in the memory 308.

After the processor 120 determines the current suspension setting 808 based on the current driver distribution profile 804, the processor 120 is configured to adjust the stored suspension setting 408 to generate a stored adjusted suspension setting 1108 corresponding to the current suspension setting 808. In some embodiments, the processor 120 is further configured to control the one or more shock absorbers 112 of the vehicle 100 (shown in FIG. 1) based on the stored adjusted suspension setting 1108.

Figure 12A:
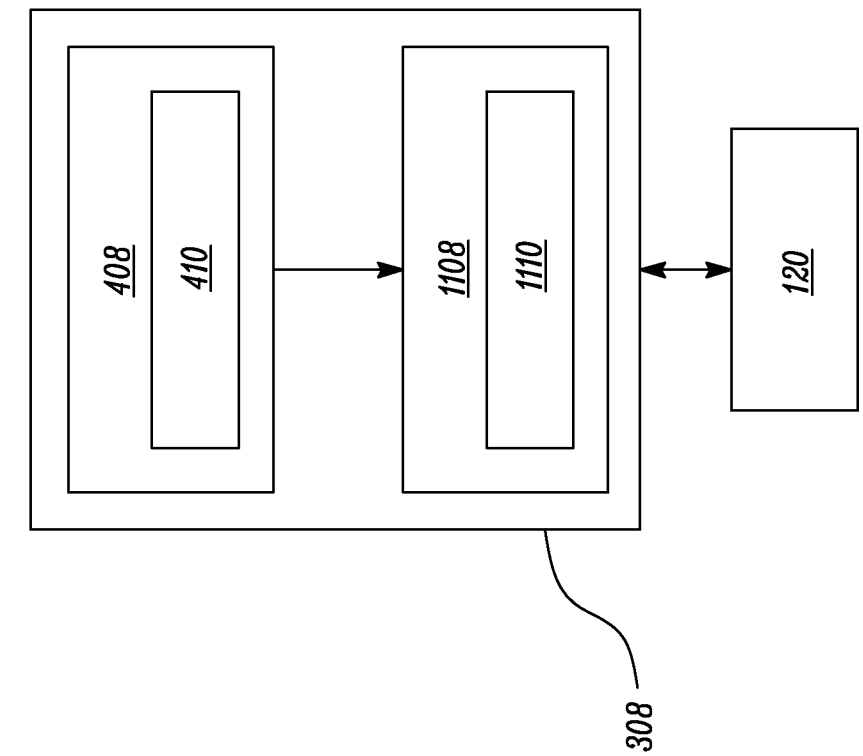
FIG. 12A is another detailed functional block diagram of the system of FIG. 3A, according to an embodiment of the present disclosure.

FIG. 12A illustrates another detailed functional block diagram of the system 300, according to an embodiment of the present disclosure. For illustrative purposes, some components of the system 300 are not shown in FIG. 12A. The system 300 is implementable by the processor 120, when the processor 120 executes the set of instructions 312 (shown in FIG. 3A) stored in the memory 308.

In some embodiments, for adjusting the stored suspension setting 408 to the stored adjusted suspension setting 1108, the processor 120 is further configured to switch directly from the stored suspension setting 408 to the stored adjusted suspension setting 1108. In other words, the processor 120 is configured to control the one or more shock absorbers 112 of the vehicle 100, such that a state of the one or more shock absorbers 112 switches directly from a state corresponding to the stored suspension setting 408 to a state corresponding to the stored adjusted suspension setting 1108. Therefore, when the processor 120 switches directly from the stored suspension setting 408 to the stored adjusted suspension setting 1108, the driver of the vehicle 100 may experience a sudden transition in the state of the one or more shock absorbers 112 and/or the suspension system 102.

Figure 12B:
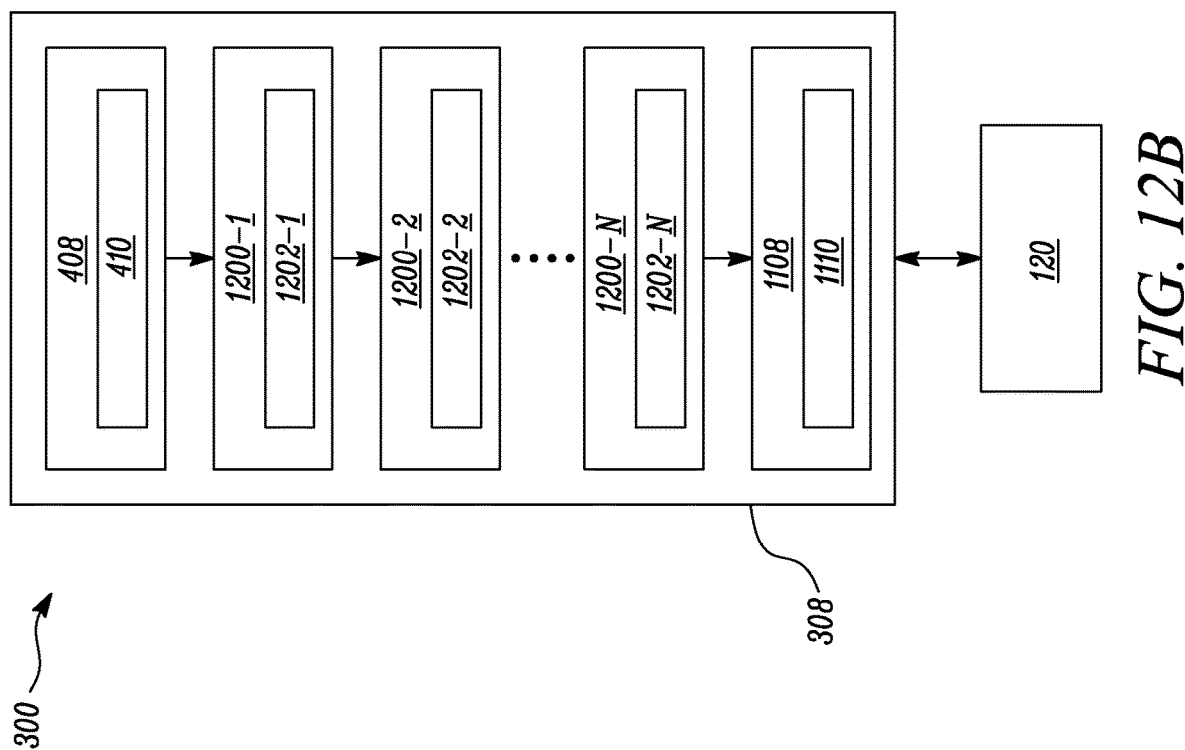
FIG. 12B is another detailed functional block diagram of the system of FIG. 3A, according to an embodiment of the present disclosure.

FIG. 12B illustrates another detailed functional block diagram of the system 300, according to an embodiment of the present disclosure. For illustrative purposes, some components of the system 300 are not shown in FIG. 12B. The system 300 is implementable by the processor 120, when the processor 120 executes the set of instructions 312 (shown in FIG. 3A) stored in the memory 308.

In some embodiments, for adjusting the stored suspension setting 408 to the stored adjusted suspension setting 1108, the processor 120 is further configured to incrementally adjust the stored suspension setting 408 to the stored adjusted suspension setting 1108 through one or more intermediate suspension settings. In the illustrated embodiment of FIG. 12B, the processor 120 adjusts the stored suspension setting 408 to the stored adjusted suspension setting 1108 through the one or more intermediate suspension settings 1200-1, 1200-2 . . . 1200-N. The one or more intermediate suspension settings 1200-1, 1200-2 . . . 1200-N may relate to one or more intermediate states of the shock absorbers 112. The one or more intermediate states of the shock absorbers 112 may lie between the states of the shock absorbers 112 corresponding to the stored suspension setting 408 and the stored adjusted suspension setting 1108.

In some embodiments, the processor 120 is further configured to control the one or more shock absorbers 112 of the vehicle 100 based on the one or more intermediate suspension settings 1200-1, 1200-2 . . . 1200-N, prior to the adjustment of the stored suspension setting 408 to the stored adjusted suspension setting 1108. Therefore, when the stored suspension setting 408 is incrementally adjusted to the stored adjusted suspension setting 1108 through the one or more intermediate suspension settings 1200-1, 1200-2 . . . 1200-N, the driver of the vehicle 100 may experience a gradual transition in the state of the one or more shock absorbers 112 and/or the suspension system 102.

Referring again to FIG. 11, the system 300 further includes an output device 1152 communicably coupled to the processor 120. In some cases, the output device 1152 may be a display unit, a speaker, an audio-visual unit, and so on. The output device 1152 may generate a notification 1150 for the driver prior to adjustment of the stored suspension setting 408 to the stored adjusted suspension setting 1108. In some cases, the notification 1150 may include a text message, an image, a pictograph, an audio-visual message, an alarm, and so on. Therefore, in some embodiments, the processor 120 is further configured to generate the notification 1150 for the driver prior to adjusting the stored suspension setting 408 to the stored adjusted suspension setting 1108.

In some embodiments, after the processor 120 determines the current suspension function 810, the processor 120 is further configured to adjust the stored suspension function 410 to a stored adjusted suspension function 1110 corresponding to the current suspension function 810. In some embodiments, the processor 120 is further configured to control the one or more shock absorbers 112 of the vehicle 100 (shown in FIG. 1) based on the stored adjusted suspension function 1110.

Figure 13A:
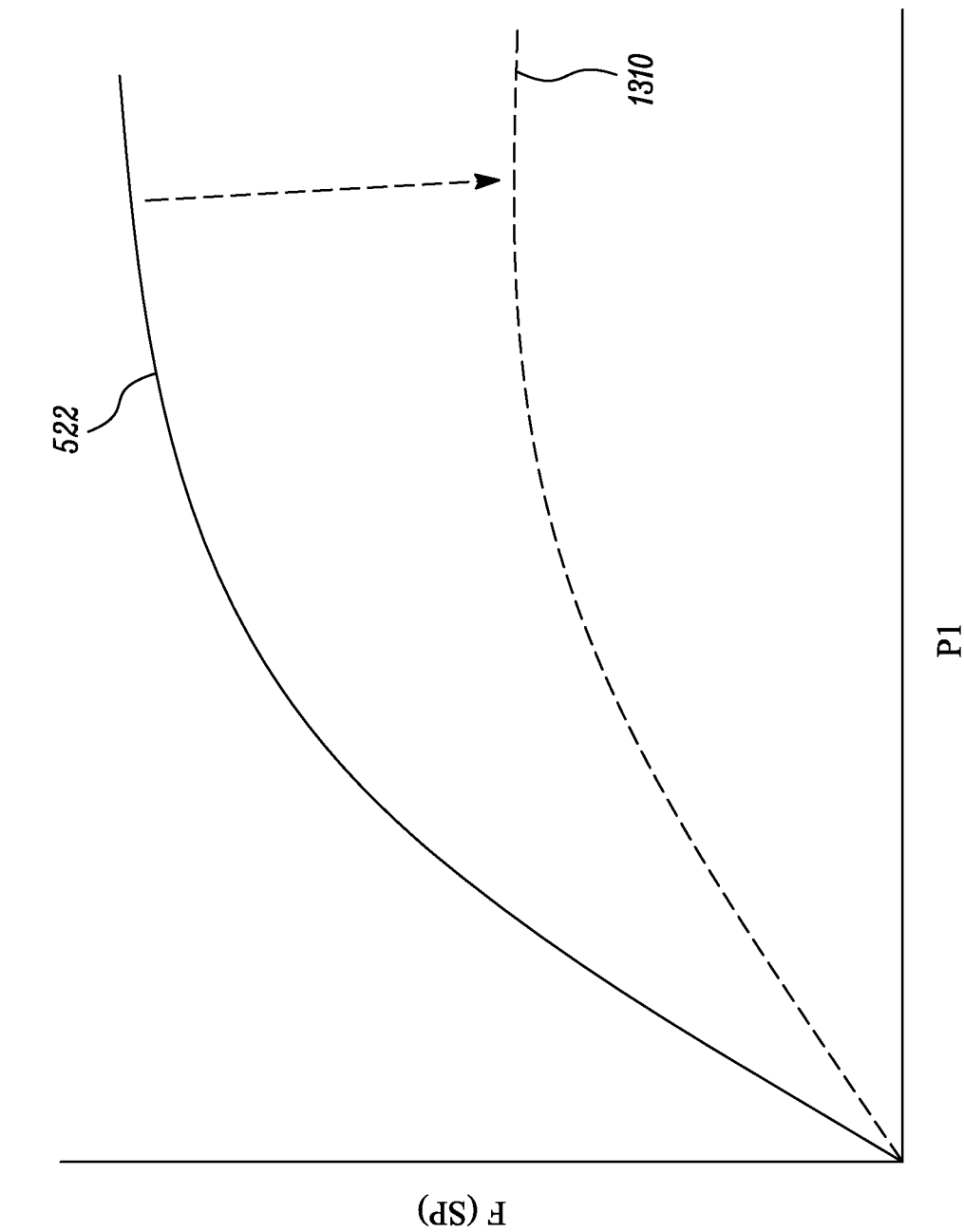
FIG. 13A is a plot depicting a stored adjusted suspension function corresponding to the driver input parameter corresponding to FIG. 5B, according to an embodiment of the present disclosure.

FIG. 13A illustrates a plot 1300 depicting a graphical representation of the stored suspension function 410 and the stored adjusted suspension function 1110 based on the driver input parameter P1, according to an embodiment of the present disclosure. The stored suspension function 410 is depicted by the suspension curve 522 (also shown in FIGS.

5B and 9B) and the stored adjusted suspension function 1110 is depicted by a suspension curve 1310.

Referring to FIGS. 12A and 13A, in some embodiments, for adjusting the stored suspension function 410 to the stored adjusted suspension function 1110, the processor 120 is further configured to switch directly from the stored suspension function 410 to the stored adjusted suspension function 1110. In such cases, the driver of the vehicle 100 may experience a more sudden transition in the state of the one or more shock absorbers 112. Therefore, when the processor 120 switches directly from the stored suspension function 410 to the stored adjusted suspension function 1110, the driver of the vehicle 100 may experience a sudden transition in the state of the one or more shock absorbers 112 and/or the suspension system 102.

Figure 13B:
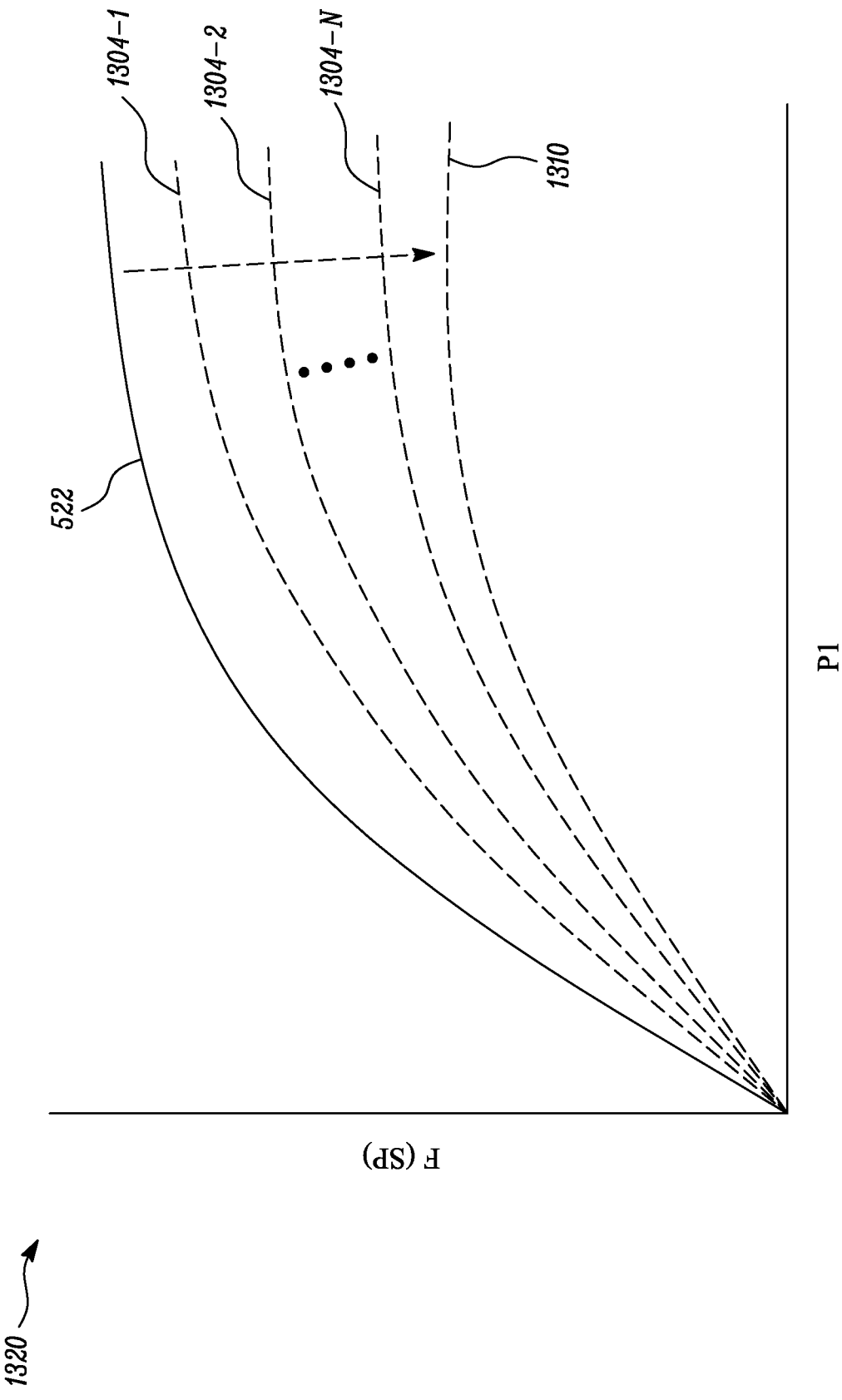
FIG. 13B is a plot depicting the stored adjusted suspension function, according to another embodiment of the present disclosure.

FIG. 13B illustrates a plot 1320 depicting a graphical representation of the stored suspension function 410 and the stored adjusted suspension function 1110, according to an embodiment of the present disclosure. The stored suspension function 410 is depicted by the suspension curve 522 (also shown in FIGS. 5B, 9B and 13A). The stored adjusted suspension function 1110 is depicted by the suspension curve 1310 (also shown in FIG. 13A).

Referring to FIGS. 11, 12B and 13B, the plot 1320 further depicts a graphical representation of the one or more intermediate suspension functions 1202-1, 1202-2 . . . 1202-N (corresponding to the one or more intermediate suspension settings 1200-1, 1200-2 . . . 1200-N) disposed between the stored suspension function 410 and the stored adjusted suspension function 1110. The one or more intermediate suspension functions 1202-1, 1202-2 . . . 1202-N are depicted by respective one or more intermediate suspension curves 1304-1, 1304-2 . . . 1304-N. The one or more intermediate suspension curves 1304-1, 1304-2 . . . 1304-N are correspondingly disposed between the suspension curves 522, 1310.

In some embodiments, for adjusting the stored suspension function 410 to the stored adjusted suspension function 1110, the processor 120 is configured to incrementally adjust the stored suspension function 410 to the stored adjusted suspension function 1110 via the one or more intermediate suspension functions 1202-1, 1202-2 . . . 1202-N disposed between the stored suspension function 410 and the stored adjusted suspension function 1110. In some embodiments, the processor 120 is further configured to control the one or more shock absorbers 112 of the vehicle 100 based on the one or more intermediate suspension functions 1202-1, 1202-2 . . . 1202-N prior to adjustment of the stored suspension function 410 to the stored adjusted suspension function 1110. Therefore, when the stored suspension function 410 is incrementally adjusted to the stored adjusted suspension function 1110 through the one or more intermediate suspension functions 1202-1, 1202-2 . . . 1202-N, the driver of the vehicle 100 may experience a gradual transition in the state of the one or more shock absorbers 112 and/or the suspension system 102.

FIG. 13C illustrates another detailed functional block diagram of the system 300, according to an embodiment of the present disclosure. For illustrative purposes, some components of the system 300 are not shown in FIG. 13C. The system 300 is implementable by the processor 120, when the processor 120 executes the set of instructions 312 (shown in FIG. 3A) stored in the memory 308.

Figure 13D:
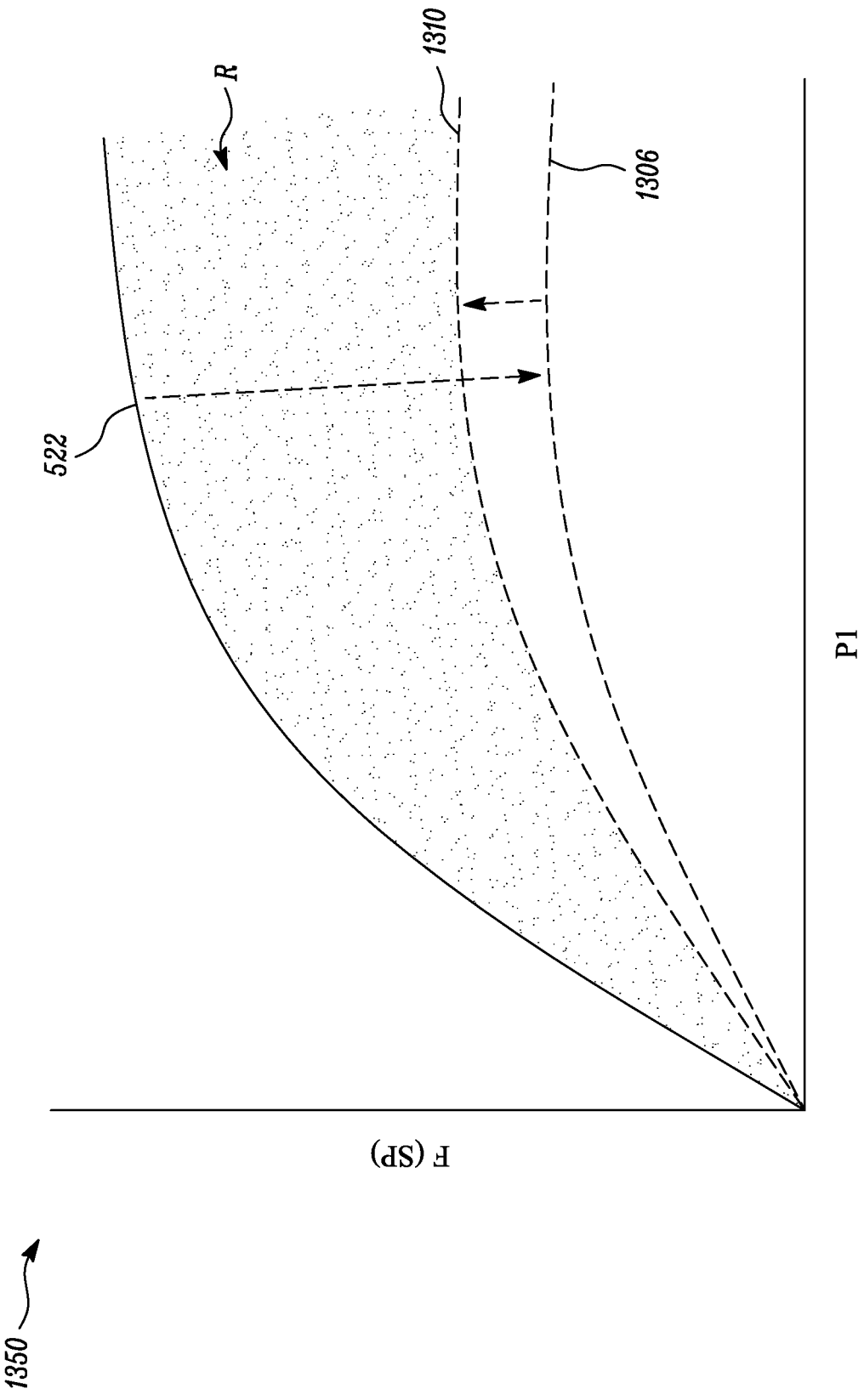
FIG. 13D is a plot depicting the stored adjusted suspension function, according to another embodiment of the present disclosure.

FIG. 13D illustrates a plot 1350 depicting a graphical representation of the stored suspension function 410 and the stored adjusted suspension function 1110 based on the driver input parameter P1, according to an embodiment of the present disclosure. The stored suspension function 410 is depicted by the suspension curve 522 (also shown in FIGS. 5B, 9B, 13A, and 13B) and the stored adjusted suspension function 1110 is depicted by the suspension curve 1310 (also shown in FIGS. 13A and 13B).

Referring to FIGS. 13C and 13D, the plot 1350 further depicts a graphical representation of an overshoot suspension function 1340 depicted by an overshoot suspension curve 1306. In some embodiments, for adjusting the stored suspension function 410 to the stored adjusted suspension function 1110, the processor 120 is further configured to adjust the stored suspension function 410 to the stored adjusted suspension function 1110 via the overshoot suspension function 1340. The overshoot suspension function 1340 (depicted by the overshoot suspension curve 1306) is disposed at least partially outside a region "R" bounded by the stored suspension function 410 and the stored adjusted suspension function 1110. Specifically, the region "R" is bounded by the suspension curve 522 and the suspension curve 1310. Therefore, the overshoot suspension curve 1306 is disposed at least partially outside the region "R".

In some embodiments, the processor 120 is further configured to control the one or more shock absorbers 112 of the vehicle based on the overshoot suspension function 1340 prior to adjustment of the stored suspension function 410 to the stored adjusted suspension function 1110.

Referring to FIG. 11, the processor 120 adjusts the stored suspension setting 408 to generate the stored adjusted suspension setting 1108 corresponding to the current suspension setting 808. Moreover, the processor 120 determines the current suspension setting 808 based on the current driver distribution profile 804, which is further based on the current value of the driver input parameter. The current value of the driver input parameter is indicative of driver behavior. The processor 120 further controls the one or more shock absorbers 112 of the vehicle 100 (shown in FIG. 1) based on the stored adjusted suspension setting 1108. Therefore, it can be stated that the processor 120 may control the one or more shock absorbers 112 based on the current value of the driver input parameter. In other words, the system 300 including the processor 120 may control the one or more shock absorbers 112 based on the driver behavior. The driver of the vehicle 100 may therefore experience a suspension setting according to current value of the driver input parameter or current driver behavior.

Hence, the suspension setting of the vehicle 100 may be controlled and adjusted based on the driver behavior. Further, the system 300 including the processor 120 may provide a correlation between the driver behavior and the vehicle dynamics to adjust the suspension setting of the vehicle 100 for a particular driver. Therefore, the system 300 may improve the ride quality and the ride comfort for the driver by adjusting the suspension setting based on the driver behavior and driver input parameter.

Referring again to FIG. 11, the processor 120 is further configured to adjust the stored driver distribution profile 404 based on the current driver distribution profile 804 in order to obtain a stored adjusted driver distribution profile 1104. For example, the stored driver distribution profile 404 may be based on a weighted moving average value V1 of the driver input parameter over a time period t1, and the current driver distribution profile 804 may be determined based on a current value V2 of the driver input parameter detected over a time period t2, where t2 refers to a current time period. Therefore, the processor 120 adjusts the stored driver distribution profile 404 (determined based on the weighted moving average value V1 of the driver input parameter)

based on the current driver distribution profile 804 (determined based on the current value V2 of the driver input parameter) to obtain the stored adjusted driver distribution profile 1104.

In some embodiments, the processor 120 is further configured to replace the stored driver distribution profile 404 with the stored adjusted driver distribution profile 1104 in the memory 308.

In some embodiments, the processor 120 is further configured to adjust the stored distribution function 406 based on the current distribution function 806 in order to obtain a stored adjusted distribution function 1106.

Figure 13E:
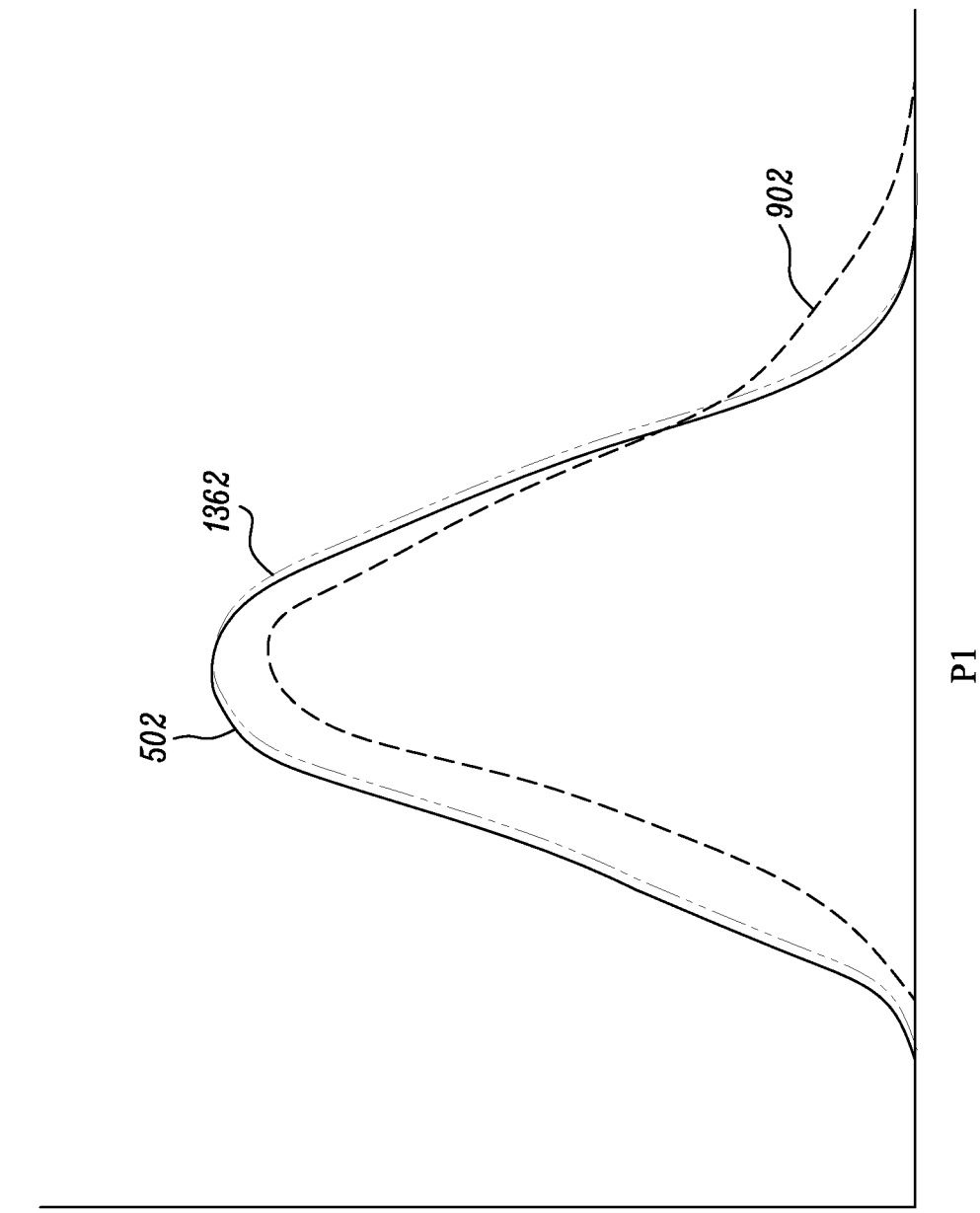
FIG. 13E is a plot depicting a stored adjusted distribution function corresponding to the current distribution function of FIG. 9A, according to an embodiment of the present disclosure.

FIG. 13E illustrates a plot 1360 depicting a graphical representation of the stored adjusted distribution function 1106 (shown in FIG. 11) corresponding to the current distribution function 806 (shown in FIGS. 8 and 11) of the driver input parameter P1 of the vehicle 100, according to an embodiment of the present disclosure. The stored adjusted distribution function 1106 is depicted by a curve 1362. The current distribution function 806 is depicted by the curve 902 of FIG. 9A, and the stored distribution function 406 is depicted by the curve 502 of FIG. 5A. The processor 120 adjusts the stored distribution function 406 (depicted by the curve 502) based on the current distribution function 806 (depicted by the curve 902) to generate the stored adjusted distribution function 1106 (depicted by the curve 1362).

In some embodiments, the processor 120 is further configured to replace the stored distribution function 406 with the stored adjusted distribution function 1106 in the memory 308.

With continued reference to FIG. 11, the processor 120 is configured to replace the stored suspension setting 408 with the stored adjusted suspension setting 1108 in the memory 308, such that the stored adjusted suspension setting 1108 corresponds to the driver. In some embodiments, the processor 120 is further configured to replace the stored suspension function 410 with the stored adjusted suspension function 1110 in the memory 308.

In an example, in a first driving cycle, once the stored adjusted suspension setting 1108 is generated, the processor 120 replaces the stored suspension setting 408 with the stored adjusted suspension setting 1108 in the memory 308. The stored adjusted suspension setting 1108 generated in the first driving cycle is considered as the stored suspension setting 408 in a second driving cycle. In the second driving cycle, the processor 120 again determines the current suspension setting 808 if the deviation between the current driver distribution profile 804 (for the second cycle) and the stored driver distribution profile 404 (for the second cycle) is greater than a predetermined threshold. In the second driving cycle, the current suspension setting 808 is based on the current driver distribution profile, which is further based on the current value of the driver input parameter corresponding to the second driving cycle. In other words, in the second driving cycle, the processor 120 again determines the current suspension setting 808 based on the current driver distribution profile, which is further based on the driver behavior corresponding to the second driving cycle.

For each driving cycle, if the deviation between the current driver distribution profile 804 and the stored driver distribution profile 404 is greater than the predetermined threshold, the processor 120 generates a new stored adjusted suspension setting 1108 that will replace the stored suspension setting 408 in the memory 308. Such a process is repeated in each driving cycle, so that the system 300 controls the one or more shock absorbers 112 of the vehicle 100 in each driving cycle based on the driver behavior.

Thus, the system 300 including the processor 120 may continuously adjust and control the suspension settings and/or the one or more shock absorbers 112 of the vehicle 100 based on the driver behavior and the current value of the driver input parameter. The continuous adjustment and subsequent controlling of the one or more shock absorbers 112 of the vehicle 100 based on the adjustment may provide an improved ride quality. The system 300 may learn the behavior of a driver and control the one or more shock absorbers 112 of the vehicle 100 based on that behavior.

Moreover, the system 300 including the processor 120 may dynamically generate a desired suspension setting based on current driver behavior. The dynamic generation of the suspension settings may not depend on preset suspension settings as in conventional suspension units. Therefore, continuous adjustment of the suspension settings may be possible instead of discrete adjustment to the preset suspension settings as in the conventional suspension units.

Figure 14:
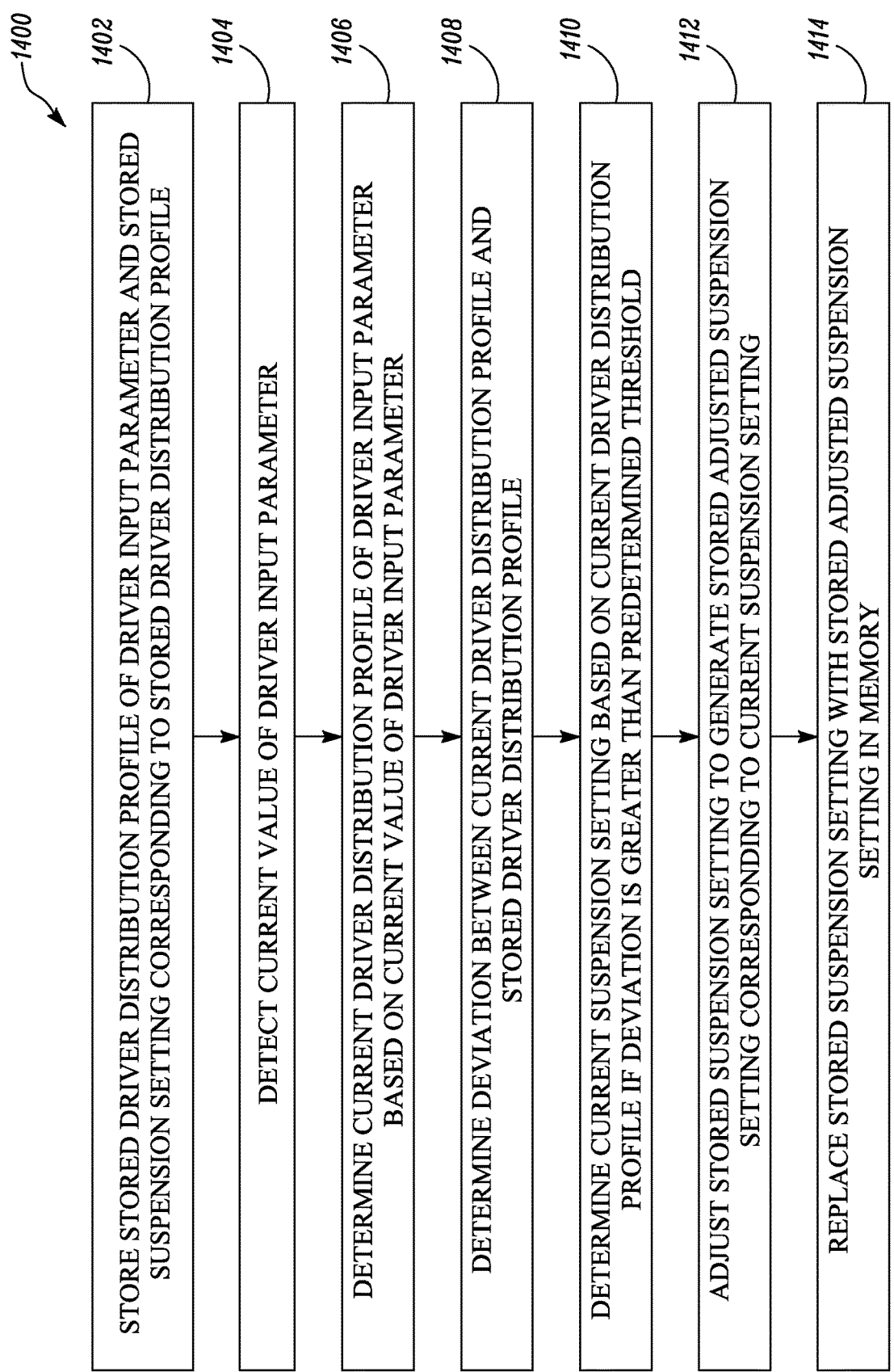
FIG. 14 is a flowchart depicting a method for use with the vehicle, according to an embodiment of the present disclosure.

FIG. 14 illustrates a flowchart depicting a method 1400 for use with the vehicle 100 (shown in FIG. 1), according to an embodiment of the present disclosure.

Referring to FIGS. 4 and 14, at step 1402, the method 1400 includes storing, in the memory 308, the stored driver distribution profile 404 of the driver input parameter, and the stored suspension setting 408 corresponding to the stored driver distribution profile 404. Each of the stored driver distribution profile 404 and the stored suspension setting 408 corresponds to the driver of the vehicle 100.

In some embodiments, the method 1400 further includes storing, in the memory 308, the default suspension setting 412 (shown in FIG. 4). The method 1400 further includes controlling the one or more shock absorbers 112 of the vehicle 100 based on the default suspension setting 412 prior to storing of the stored driver distribution profile 404 corresponding to the driver in the memory 308.

Referring now to FIGS. 8 and 14, at step 1404, the method 1400 further includes detecting, by the sensor 302, the current value of the driver input parameter while the driver is driving the vehicle 100. Specifically, the method 1400 may include generating, by the sensor 302, the set of signals 820 indicative of the current value of the driver input parameter while the driver is driving the vehicle 100. The method 1400 subsequently includes receiving, by the processor 120, the current value of the driver input parameter while the driver is driving the vehicle 100.

At step 1406, the method 1400 further includes determining, by the processor 120, the current driver distribution profile 804 of the driver input parameter based on the current value of the driver input parameter. The method 1400 may further include temporarily storing, by the processor 120, the current driver distribution profile 804 in the memory 308.

At step 1408, the method 1400 further includes determining, by the processor 120, the deviation between the current driver distribution profile 804 and the stored driver distribution profile 404. In some embodiments, determining the deviation between the current driver distribution profile 804 and the stored driver distribution profile 404 further includes determining the anomaly score 812 between the stored distribution function 406 and the current distribution function 806.

At step 1410, the method 1400 further includes determining, by the processor 120, the current suspension setting 808 based on the current driver distribution profile 804 if the deviation is greater than the predetermined threshold. Further, the current suspension setting 808 based on the current driver distribution profile 804 is determined if the anomaly score 812 is greater than the predetermined threshold.

Referring now to FIGS. 11 and 14, at step 1412, the method 1400 further includes adjusting, by the processor 120, the stored suspension setting 408 to generate the stored adjusted suspension setting 1108 corresponding to the current suspension setting 808. In some embodiments, the method 1400 further includes controlling the one or more shock absorbers 112 of the vehicle 100 based on the stored adjusted suspension setting 1108.

Referring now to FIGS. 12A and 14, in some embodiments, adjusting the stored suspension setting 408 further includes switching directly from the stored suspension setting 408 to the stored adjusted suspension setting 1108.

Referring now to FIGS. 12B and 14, in some embodiments, adjusting the stored suspension setting 408 further includes incrementally adjusting the stored suspension setting 408 to the stored adjusted suspension setting 1108 through the one or more intermediate suspension settings 1200-1, 1200-2 . . . 1200-N. In some embodiments, the method 1400 further includes controlling the one or more shock absorbers 112 of the vehicle 100 based on the one or more intermediate suspension settings 1200-1, 1200-2 . . . 1200-N prior to the adjustment of the stored suspension setting 408 to the stored adjusted suspension setting 1108.

Referring again to FIGS. 11 and 14, the method 1400 further includes generating the notification 1150 for the driver prior to adjusting the stored suspension setting 408 to the stored adjusted suspension setting 1108. In some cases, the method 1400 includes generating, by the output device 1152 communicably coupled to the processor 120, the notification 1150 for the driver prior to adjusting the stored suspension setting 408 to the stored adjusted suspension setting 1108.

In some embodiments, adjusting the stored suspension setting 408 further includes adjusting the stored suspension function 410 to the stored adjusted suspension function 1110 corresponding to the current suspension function 810. In some embodiments, the method 1400 further includes controlling the one or more shock absorbers 112 of the vehicle 100 based on the stored adjusted suspension function 1110.

Referring now to FIGS. 12A, 13A and 14, in some embodiments, adjusting the stored suspension setting 408 further includes switching directly from the stored suspension function 410 (depicted by the suspension curve 522 of FIG. 13A) to the stored adjusted suspension function 1110 (depicted by the suspension curve 1310 of FIG. 13A).

Referring now to FIGS. 12B, 13B and 14, in some embodiments, adjusting the stored suspension setting 408 further includes incrementally adjusting the stored suspension function 410 to the stored adjusted suspension function 1110 via the one or more intermediate suspension functions 1202-1, 1202-2 . . . 1202-N (depicted by the respective one or more intermediate suspension curves 1304-1, 1304-2 . . . 1304-N of FIG. 13B) disposed between the stored suspension function 410 and the stored adjusted suspension function 1110. In some embodiments, the method 1400 further includes controlling the one or more shock absorbers 112 of the vehicle 100 based on the one or more intermediate suspension functions 1202-1, 1202-2 . . . 1202-N prior to adjustment of the stored suspension function 410 to the stored adjusted suspension function 1110.

Referring now to FIGS. 13C, 13D and 14, in some embodiments, adjusting the stored suspension setting 408 further includes adjusting the stored suspension function 410 to the stored adjusted suspension function 1110 via the overshoot suspension function 1340 disposed at least partially outside the region "R" bounded by the stored suspension function 410 and the stored adjusted suspension function 1110. In some embodiments, the method 1400 further includes controlling the one or more shock absorbers 112 of the vehicle 100 based on the overshoot suspension function 1340 prior to adjustment of the stored suspension function 410 to the stored adjusted suspension function 1110.

Referring again to FIGS. 11 and 14, the method 1400 further includes adjusting the stored driver distribution profile 404 based on the current driver distribution profile 804 in order to obtain the stored adjusted driver distribution profile 1104. In some embodiments, the method 1400 further includes replacing the stored driver distribution profile 404 with the stored adjusted driver distribution profile 1104 in the memory 308.

In some embodiments, the method 1400 further includes adjusting the stored distribution function 406 based on the current distribution function 806 in order to obtain the stored adjusted distribution function 1106. In some embodiments, the method 1400 further includes replacing the stored distribution function 406 with the stored adjusted distribution function 1106 in the memory 308.

With continued reference to FIGS. 11 and 14, at step 1414, the method 1400 includes replacing, by the processor 120, the stored suspension setting 408 with the stored adjusted suspension setting 1108 in the memory 308, such that the stored adjusted suspension setting 1108 corresponds to the driver. In some embodiments, the method 1400 further includes replacing, by the processor 120, the stored suspension function 410 with the stored adjusted suspension function 1110 in the memory 308.

Figure 15:
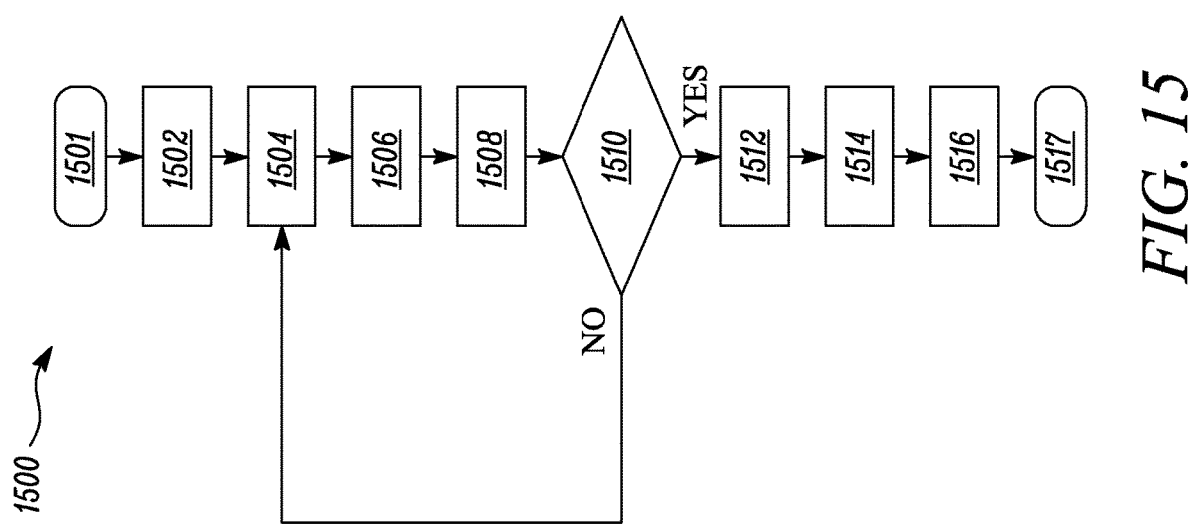
FIG. 15 is a flowchart of a process to generate a stored adjusted suspension setting corresponding to a driver of the vehicle, according to an embodiment of the present disclosure.

FIG. 15 is a flowchart of a process 1500 to generate the stored adjusted suspension setting 1108 (shown in FIG. 11) corresponding to the driver of the vehicle 100 (shown in FIG. 1). The process 1500 is embodied as a machine learning algorithm implemented by the processor 120 and may be stored in the memory 308 of the system 300 of FIG. 11.

In some cases, the process 1500 is embodied as an unsupervised machine learning algorithm implemented by the processor 120. Few examples of the unsupervised machine learning algorithm may include continuous clustering and dimensionality reduction techniques, K-means clustering, Singular Value Decomposition (SVD), Principal Component Analysis (PCA), Artificial Neural Network (ANN), Hidden Markov Model (HMM), and so on.

In some cases, the process 1500 is embodied as a supervised machine learning algorithm implemented by the processor 120. Few examples of the supervised machine learning algorithm may include linear regression, polynomial regression, decision trees, and so on.

At a block 1501, the process 1500 begins. Referring now to FIGS. 4 and 15, at a block 1502, the processor 120 is configured to store the stored driver distribution profile 404 of the driver input parameter, and the stored suspension setting 408 corresponding to the stored driver distribution profile 404 in the memory 308. The process further moves to a block 1504.

Referring now to FIGS. 8 and 15, at the block 1504, the processor 120 is configured to receive, from the sensor 302, the current value of the driver input parameter while the driver is driving the vehicle. In some embodiments, the processor 120 receives the set of signals 820 indicative of the current value of the driver input parameter generated by the sensor 302.

The process 1500 further moves to a block 1506. At the block 1506, the processor 120 is configured to determine the current driver distribution profile 804 of the driver input parameter based on the current value of the driver input parameter.

The process 1500 further moves to a block 1508. At the block 1508, the processor 120 is configured to determine the deviation between the current driver distribution profile 804 and the stored driver distribution profile 404. In some embodiments, for determining the deviation between the current driver distribution profile 804 and the stored driver distribution profile 404, the processor 120 is further configured to determine the anomaly score 812 between the stored distribution function 406 and the current distribution function 806.

The process 1500 further moves to a block 1510. At the block 1510, the processor 120 is configured to determine if the deviation between the current driver distribution profile 804 and the stored driver distribution profile 404 is greater than the predetermined threshold.

If the anomaly score 812 is greater than the predetermined threshold, it is indicative of the deviation between the current driver distribution profile 804 and the stored driver distribution profile 404 being greater than the predetermined threshold. If the processor 120 determines that the deviation is greater than the predetermined threshold, the process 1500 moves to a block 1512. However, in some cases, if the processor 120 determines that the deviation is not greater than the predetermined threshold (i.e., the deviation is equal to or less than the predetermined threshold), the process 1500 further returns to the block 1504.

At the block 1512, the processor 120 is configured to determine the current suspension setting 808 based on the current driver distribution profile 804. The process 1500 further moves to a block 1514.

Referring now to FIGS. 11 and 15, at the block 1514, the processor 120 is configured to adjust the stored suspension setting 408 to generate the stored adjusted suspension setting 1108 corresponding to the current suspension setting 808. In some embodiments, the processor 120 is further configured to control the one or more shock absorbers 112 of the vehicle 100 based on the stored adjusted suspension setting 1108. The process 1500 further moves to a block 1516.

At the block 1516, the processor 120 is configured to replace the stored suspension setting 408 with the stored adjusted suspension setting 1108 in the memory 308, such that the stored adjusted suspension setting 1108 corresponds to the driver.

From the block 1516, the process 1500 moves to a block 1517 where the process 1500 is terminated. In other words, at the block 517, an iteration of the process 1500 is completed. Further, a next iteration of the process 1500 can be initiated again, starting at the block 1501. In some cases, the process 1500 may be initiated when the vehicle 100 (shown in FIG. 1) is started and may be continuously iterated until the vehicle 100 stops.

While aspects of the present disclosure have been particularly shown and described with reference to the embodiments above, it will be understood by those skilled in the art that various additional embodiments can be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for a vehicle, the system comprising:
   a memory storing a stored driver distribution profile and a stored distribution function of a driver input parameter and a stored suspension setting corresponding to the stored driver distribution profile, wherein each of the stored driver distribution profile, the stored distribution function and the stored suspension setting corresponds to a driver of the vehicle;
   a sensor to detect a current value of the driver input parameter while the driver is driving the vehicle; and
   a processor communicably coupled to the memory and the sensor, wherein the processor is configured to:
   determine a current driver distribution profile of the driver input parameter based on the current value of the driver input parameter;
   determine a deviation between the current driver distribution profile and the stored driver distribution profile;
   determine a current suspension setting based on the current driver distribution profile if the deviation is greater than a predetermined threshold;
   adjust the stored suspension setting to generate a stored adjusted suspension setting corresponding to the current suspension setting; and
   replace the stored suspension setting with the stored adjusted suspension setting in the memory such that the stored adjusted suspension setting corresponds to the driver.

2. The system of claim 1, wherein the driver input parameter comprises at least one of a position of an accelerator pedal of the vehicle, a first time derivative of the position of the accelerator pedal of the vehicle, a second time derivative of the position of the accelerator pedal of the vehicle, a steering wheel angle of the vehicle, a first time derivative of the steering wheel angle of the vehicle, a second time derivative of the steering wheel angle of the vehicle, a brake pedal pressure of the vehicle, a first time derivative of the brake pedal pressure of the vehicle, a second time derivative of the brake pedal pressure of the vehicle, a speed of the vehicle, a longitudinal acceleration of the vehicle, a first time derivative of the longitudinal acceleration of the vehicle, a lateral acceleration of the vehicle, a first time derivative of the lateral acceleration of the vehicle, a gear position of the vehicle, and an engine speed of the vehicle.

3. The system of claim 1, wherein the current driver distribution profile comprises a current distribution function of the driver input parameter.

4. The system of claim 3, wherein the processor is further configured to:
   adjust the stored distribution function based on the current distribution function in order to obtain a stored adjusted distribution function; and
   replace the stored distribution function with the stored adjusted distribution function in the memory.

5. The system of claim 3, wherein the processor is further configured to determine an anomaly score between the stored distribution function and the current distribution function in order to determine the deviation between the current driver distribution profile and the stored driver distribution profile.

6. The system of claim 5, wherein the processor is further configured to determine the current suspension setting if the anomaly score is greater than the predetermined threshold.

7. The system of claim 1, wherein the stored suspension setting comprises a stored suspension function and the current suspension setting comprises a current suspension function, and wherein the processor is further configured to:

adjust the stored suspension function to a stored adjusted suspension function corresponding to the current suspension function; and control one or more shock absorbers of the vehicle based on the stored adjusted suspension function.

8. The system of claim 7, wherein the processor is further configured to incrementally adjust the stored suspension function to the stored adjusted suspension function via one or more intermediate suspension functions disposed between the stored suspension function and the stored adjusted suspension function, and wherein the processor is further configured to control the one or more shock absorbers of the vehicle based on the one or more intermediate suspension functions prior to adjustment of the stored suspension function to the stored adjusted suspension function.

9. The system of claim 7, wherein the processor is further configured to switch directly from the stored suspension function to the stored adjusted suspension function.

10. The system of claim 7, wherein the processor is further configured to adjust the stored suspension function to the stored adjusted suspension function via an overshoot suspension function disposed at least partially outside a region bounded by the stored suspension function and the stored adjusted suspension function, and wherein the processor is further configured to control the one or more shock absorbers of the vehicle based on the overshoot suspension function prior to adjustment of the stored suspension function to the stored adjusted suspension function.

11. The system of claim 1, wherein the processor is further configured to incrementally adjust the stored suspension setting to the stored adjusted suspension setting through one or more intermediate suspension settings, and wherein the processor is further configured to control one or more shock absorbers of the vehicle based on the one or more intermediate suspension settings prior to the adjustment of the stored suspension setting to the stored adjusted suspension setting.

12. The system of claim 1, wherein the processor is further configured to switch directly from the stored suspension setting to the stored adjusted suspension setting.

13. The system of claim 1, wherein the processor is further configured to generate a notification for the driver prior to adjusting the stored suspension setting to the stored adjusted suspension setting.

14. The system of claim 1, wherein the processor is further configured to control one or more shock absorbers of the vehicle based on the stored adjusted suspension setting.

15. The system of claim 1, wherein the processor is further configured to:
adjust the stored driver distribution profile based on the current driver distribution profile in order to obtain a stored adjusted driver distribution profile; and
replace the stored driver distribution profile with the stored adjusted driver distribution profile in the memory.

16. The system of claim 1, wherein the memory further stores a default suspension setting, and wherein the processor is configured to control one or more shock absorbers of the vehicle based on the default suspension setting prior to storage of the stored driver distribution profile corresponding to the driver in the memory.

17. The system of claim 1, wherein the stored distribution function is determined based on a variation of the driver input parameter with respect to time.

18. The system of claim 1, wherein the stored distribution function is a function of a moving average value of the driver input parameter over a period of time.

19. A method for use with a vehicle, the method comprising:
storing, in a memory, a stored driver distribution profile and a stored distribution function of a driver input parameter and a stored suspension setting corresponding to the stored driver distribution profile, wherein each of the stored driver distribution profile, the stored distribution function and the stored suspension setting corresponds to a driver of the vehicle;
detecting, by a sensor, a current value of the driver input parameter while the driver is driving the vehicle;
determining, by a processor, a current driver distribution profile of the driver input parameter based on the current value of the driver input parameter;
determining, by the processor, a deviation between the current driver distribution profile and the stored driver distribution profile;
determining, by the processor, a current suspension setting based on the current driver distribution profile if the deviation is greater than a predetermined threshold;
adjusting, by the processor, the stored suspension setting to generate a stored adjusted suspension setting corresponding to the current suspension setting; and
replacing, by the processor, the stored suspension setting with the stored adjusted suspension setting in the memory such that the stored adjusted suspension setting corresponds to the driver.

20. The method of claim 19, wherein the current driver distribution profile comprises a current distribution function of the driver input parameter, wherein determining the deviation between the current driver distribution profile and the stored driver distribution profile further comprises determining an anomaly score between the stored distribution function and the current distribution function, and wherein the current suspension setting based on the current driver distribution profile is determined if the anomaly score is greater than the predetermined threshold.

21. The method of claim 19, wherein the stored suspension setting comprises a stored suspension function and the current suspension setting comprises a current suspension function, wherein adjusting the stored suspension setting further comprises adjusting the stored suspension function to a stored adjusted suspension function corresponding to the current suspension function, and wherein the method further comprises controlling one or more shock absorbers of the vehicle based on the stored adjusted suspension function.

22. The method of claim 21, wherein adjusting the stored suspension setting further comprises incrementally adjusting the stored suspension setting to the stored adjusted suspension setting through one or more intermediate suspension settings, the method further comprising controlling the one or more shock absorbers of the vehicle based on the one or more intermediate suspension settings prior to the adjustment of the stored suspension setting to the stored adjusted suspension setting.

23. The method of claim 21, further comprising controlling the one or more shock absorbers of the vehicle based on the stored adjusted suspension setting.

24. The method of claim 19, wherein adjusting the stored suspension setting further comprises switching directly from the stored suspension setting to the stored adjusted suspension setting.

* * * * *